(12) United States Patent
Dickinson et al.

(10) Patent No.: US 8,420,042 B2
(45) Date of Patent: *Apr. 16, 2013

(54) PROCESS FOR THE PRODUCTION OF CARBON GRAPHENES AND OTHER NANOMATERIALS

(75) Inventors: Robert Wayne Dickinson, San Rafael, CA (US); Ben Wade Oakes Dickinson, III, San Francisco, CA (US); Jon K. Myers, San Rafael, CA (US); Oliver Douglas Ousterhout, Belvedere, CA (US); Lawrence Joseph Musetti, San Rafael, CA (US)

(73) Assignee: High Temperature Physics, LLC, Novato, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/237,766

(22) Filed: Sep. 20, 2011

(65) Prior Publication Data

US 2012/0068124 A1    Mar. 22, 2012

Related U.S. Application Data

(63) Continuation-in-part of application No. 13/090,053, filed on Apr. 19, 2011, now Pat. No. 8,377, 408.

(60) Provisional application No. 61/385,087, filed on Sep. 21, 2010.

(51) Int. Cl.
*C01B 31/02* (2006.01)
*B82B 3/00* (2006.01)

(52) U.S. Cl.
USPC .................... 423/445 B; 423/445 R; 977/843

(58) Field of Classification Search .............. 423/445 B, 423/445 R; 977/843
See application file for complete search history.

(56) References Cited

U.S. PATENT DOCUMENTS

| | | | |
|---|---|---|---|
| 3,748,282 A | 7/1973 | Evans | |
| 3,915,657 A | 10/1975 | Staffin et al. | |
| 4,188,192 A | 2/1980 | Levenson et al. | |
| 4,192,758 A | 3/1980 | Dickey et al. | |
| 4,368,182 A | 1/1983 | Mills et al. | |
| 4,943,301 A | 7/1990 | Nagle et al. | |
| 5,059,407 A | 10/1991 | Wallace et al. | |
| 5,279,716 A | 1/1994 | Sharma | |
| 5,855,678 A | 1/1999 | Sanjurjo et al. | |
| 5,989,517 A | 11/1999 | Richmond et al. | |
| 6,043,306 A | 3/2000 | Imahashi | |
| 6,130,282 A | 10/2000 | Imahashi et al. | |
| 6,143,689 A | 11/2000 | Moy et al. | |
| 6,299,742 B1 | 10/2001 | Pal et al. | |
| 6,676,920 B1 | 1/2004 | Oishi et al. | |
| 6,805,832 B2 | 10/2004 | Mohler et al. | |
| 6,819,034 B1 | 11/2004 | Pavlovsky | |
| 6,936,233 B2 | 8/2005 | Smalley et al. | |
| 7,060,246 B2 | 6/2006 | Oishi et al. | |
| 7,071,258 B1 | 7/2006 | Jang et al. | |
| 7,357,903 B2 | 4/2008 | Zhou et al. | |
| 7,458,384 B1 | 12/2008 | Seal et al. | |
| 7,514,489 B2 | 4/2009 | Granada, Jr. et al. | |
| 7,540,890 B2 * | 6/2009 | Schaefer ......................... | 44/640 |
| 7,601,321 B2 | 10/2009 | McKinnon et al. | |
| 7,601,668 B2 | 10/2009 | Zhou et al. | |
| 7,623,340 B1 | 11/2009 | Song et al. | |
| 7,662,321 B2 | 2/2010 | Guo et al. | |
| 7,666,915 B2 | 2/2010 | Zhang et al. | |
| 7,670,588 B2 | 3/2010 | Zhou et al. | |
| 7,718,155 B2 | 5/2010 | Zhang et al. | |
| 7,718,156 B2 | 5/2010 | Zhang et al. | |
| 7,732,859 B2 | 6/2010 | Anderson et al. | |
| 7,785,492 B1 * | 8/2010 | Jang et al. .................. | 252/378 R |
| 2006/0133982 A1 | 6/2006 | Kinloch et al. | |
| 2008/0118407 A1 | 5/2008 | Grace et al. | |
| 2008/0269086 A1 | 10/2008 | Adhvaryu | |
| 2008/0279755 A1 | 11/2008 | Spencer | |
| 2009/0020764 A1 | 1/2009 | Anderson et al. | |
| 2009/0033164 A1 | 2/2009 | Khan | |
| 2009/0068470 A1 | 3/2009 | Choi et al. | |
| 2009/0075083 A1 | 3/2009 | Bi et al. | |
| 2009/0075847 A1 | 3/2009 | Wawrzos et al. | |
| 2009/0082474 A1 | 3/2009 | Zhang et al. | |
| 2009/0110627 A1 | 4/2009 | Choi et al. | |
| 2009/0298684 A1 | 12/2009 | Zhou et al. | |
| 2010/0000441 A1 | 1/2010 | Jang et al. | |
| 2010/0024542 A1 | 2/2010 | Yen et al. | |
| 2010/0038263 A1 | 2/2010 | Zhou et al. | |
| 2010/0044646 A1 | 2/2010 | Zhamu et al. | |
| 2010/0176337 A1 | 7/2010 | Zhamu et al. | |

OTHER PUBLICATIONS

The Babcock & Wilcox Company, "Boiler Cleaning and Ash Handling Systems", Steam: Its Generation and Use, 41st Edition, Chapter 24, pp. 24-1, (2005).

(Continued)

*Primary Examiner* — Stuart Hendrickson
(74) *Attorney, Agent, or Firm* — Edward S. Wright

(57) ABSTRACT

Process for producing nanomaterials such as graphenes, graphene composites, magnesium oxide, magnesium hydroxides and other nanomaterials by high heat vaporization and rapid cooling. In some of the preferred embodiments, the high heat is produced by an oxidation-reduction reaction of carbon dioxide and magnesium as the primary reactants, although additional materials such as reaction catalysts, control agents, or composite materials can be included in the reaction, if desired. The reaction also produces nanomaterials from a variety of other input materials, and by varying the process parameters, the type and morphology of the carbon nanoproducts and other nanoproducts can be controlled. The reaction products include novel nanocrystals of MgO (pericilase) and $MgAl_2O_4$ (spinels) as well as composites of these nanocrystals with multiple layers of graphene deposited on or intercalated with them.

40 Claims, 11 Drawing Sheets

OTHER PUBLICATIONS

Ganjipour, B., et al., Effect of Pressure on Morphology of the Grown Layers of Carbon Nanotubes by Modified Plasma-Enhanced Chemical Vapor Deposition, Fullerenes, Nanotubes and Carbon Nanostructures, vol. 13, Issue 1, pp. 365-373 (2005).

Luxmi, Shu Nie, et al., "Temperature-Dependence of Epitaxial Graphene Formation on SiC(0001)" Journal of Electronic Materials, vol. 38, Issue 6, pp. 718-724 (2009).

Hart, Anastasios John, "Chemical, Mechanical, and Thermal Control of Substrate-Bound Carbon Nanotube Growth", Massachusetts Institute of Technology, http://dspace.mit.edu/handle/1721.1/38257 (2006).

Ghosh, Suchismita, et al., "Lattice Thermal Conductivity of Graphene", American Physical Society, APS March Meeting, Abstract #V21.010 (2010).

Horing, N. J. M., et al., "Magneto-Response of Graphene", American Physical Society, APS March Meeting, Abstract #K1.181 (2010).

Faccio, Ricardo, et al., "Mechanical Properties of Graphene Nanoribbons", Journal of Physics: Condensed Matter, vol. 21, No. 28 (2009).

Das Sarma, Sankar, et al., "Transport and Electronic Structure of Bilayer Graphene", American Physical Society, APS March Meeting, Abstract #T21.001 (2010).

Frank, I. W., et al., "Mechanical Properties of Suspended Graphene Sheets", Journal of Vacuum Science & Technology B: Microelectronics and Nanometer Structures, vol. 25, Issue 6, pp. 2558-2561 (2007).

Neto, A. H. Castro, et al., "The Electronic Properties of Graphene", Reviews of Modern Physics, vol. 81, Issue 1, pp. 109-162 (2009).

Talapatra, Saikat, et al., "Ultrathin Graphene Membranes as Flexible Electrodes for Electrochemical Double Layer Capacitors", American Physical Society, APS March Meeting, Abstract #X21.008 (2010).

Sabio, J., et al., "Electrostatic Interactions between Graphene Layers and Their Environment", Physical Review B, vol. 77, Issue 19, pp. 1-8 (2008).

Pei, Q. X., et al., "A Molecular Dynamics Study of the Mechanical Properties of Hydrogen Functionalized Graphene", Carbon, vol. 48, Issue 3, pp. 898-904 (2010).

Crommie, Michael, "Graphene Under Strain Creates Gigantic Pseudo-Magnetic Fields", Lawrence Berkeley National Laboratory News Center, http://newscenter.lbl.gov/news-releases/2010/07/29/graphene-under-strain (2010).

Wang, Guoxiu, et al., "Graphene Nanosheets for Enhanced Lithium Storage in Lithium Ion Batteries", Carbon, vol. 47, Issue 8, pp. 2049-2053 (2009).

Stoller, Meryl D., et al., "Graphene-Based Ultracapacitors", Nano Letters, vol. 8, Issue 10, pp. 3498-3502 (2008).

Stankovich, Sasha, et al., "Graphene-Based Composite Materials", Nature, vol. 442, Issue 7100, pp. 282-286 (2006).

He, Yu-Shi, et al., "A Co(OH)2-Graphene Nanosheets Composite as a High Performance Anode Material for Rechargeable Lithium Batteries", Electrochemistry Communications, vol. 12., Issue 4, pp. 570-573 (2010).

Magnesium.com, "Cost Components", Magnesium Encyclopedia, Economic Aspects, http://www.magnesium.com/w3/data-bank/article.php?mgw=157&magnesium=211, accessed Aug. 16, 2011.

CheapTubes.com, "Cheaptubes.com: The Source for Low Cost Nanoscale Carbon Products Prices", http://cheaptubes.com/carbon-nanotubes-prices.htm, accessed Aug. 16, 2011.

Wikipedia Contributors, "Pidgeon Process", Wikipedia, The Free Encyclopedia, http://en.wikipedia.org/wiki/Pidgeon_Process, accessed Aug. 16, 2011.

Mintmire, John, et al., "A Twist on Graphene Nanoribbons", American Physical Society, APS March Meeting, Abstract #P21.002, (2010).

Lu, Guanhua, et al., "Facile, Noncovalent Decoration of Graphene Oxide Sheets with Nanocrystals", Nano Research, vol. 2, No. 3, pp. 192-200, (2009).

Zayan, M. H., et al., "High Temperature Oxidation of Al—Mg Alloys", Oxidation of Metals, vol. 34, No. 3-4. pp. 323-333 (1990).

Foote, J. P., et al., "Powdered Magnesium-Carbon Dioxide Rocket Combustion Technology for In Situ Mars Propulsion", NASA Technical Report, No. NASA/TP-2007-215077, M-1203, (2007).

King, Merrill K., "A Simplified Two Reaction Zone Model of Magnesium Combustion in Carbon Dioxide", Proceedings of the Combustion Institute, vol. 29, Issue 2, pp. 2931-2938 (2002).

Steel, Steven, "Ceramic Materials for Reusable Liquid Fueled Rocket Engine Combustion Devices", The Amptiac Quarterly, vol. 8, No. 1, pp. 39-43 (2004).

Rich, David, et al., "Production of Solid Carbon through Reduction of Gaseous Carbon Dioxide with Magnesium", private presentation document from Reax Engineering, Inc. to High Temperature Physics, LLC (2010).

Shafirovich, Evgeny Ya., et al., "Combustion of Magnesium Particles in Carbon Dioxide and Monoxide", AIAA 95-2992, 31st AIAA/ASME/SAE/ASEE Joint Propulsion Conference and Exhibit, San Diego, CA, (1995).

Levchenko, I., "The Large-Scale Production of Graphene Flakes Using Magnetically-Enhanced Arc Discharge Between Carbon Electrodes", Carbon, vol. 48, Issue 15, pp. 4570-4574, (2010).

Wikipedia Contributors, "Graphene", Wikipedia, The Free Encyclopedia, http://en.wikipedia.org/wiki/Graphene, accessed Aug. 16, 2011.

Graphene Industries Limited, "What is graphene?", http://grapheneindustries.com/?What+is+graphene%3F, accessed Aug. 16, 2011.

Park, Sungjin et al., "Chemical Methods for the Production of Graphenes", Nature Nanotechnology, vol. 4, No. 4, pp. 217-224 (2009).

Geim, A.K., et al., "The Rise of Graphene", Nature Materials, vol. 6, No. 3, pp. 183-191 (2007).

Lee, Changgu, et al., "Measurement of the Elastic Properties and Intrinsic Strength of Monolayer Graphene", Science, vol. 321, No. 5887, pp. 385-388 (2008).

Bolen, Michael L, et al., "Graphene Formation Mechanisms on 4H-SiC(0001)", Physical Review B, vol. 80., Issue 11, pp. 1-9 (2009).

Obraztsov, Alexander N., "Chemical Vapour Deposition: Making Graphene on a Large Scale", Nature Nanotechnology vol. 4, No. 4, pp. 212-213 (2009).

Lu, Xuekun, et al., "Patterning of Highly Oriented Pyrolytic Graphite by Oxygen Plasma Etching", Applied Physics Letters, vol. 75, No. 2, pp. 193-195 (1999).

Park, Sungjin, et al., "Colloidal Suspensions of Highly Reduced Graphene Oxide in a Wide Variety of Organic Solvents", Nano Letters, vol. 9, No. 4, pp. 1593-1597 (2009).

Chakrabarti, Amartya, et al., "Conversion of Carbon Dioxide to Few-Layer Graphene", Journal of Materials Chemistry, vol. 21, pp. 9491-9493 (2011).

Alford, J.M., et al., "A Carbon Arc Apparatus for Production of Nanotubes in Microgravity", Seventh International Workshop on Microgravity Combustion and Chemically Reacting Systems, NASA, pp. 69-72, (2003).

Ando, Yoshinori, et al., "Preparation of Carbon Nanotubes by Arc-Discharge Evaporation", Japanese Journal of Applied Physics, vol. 32, No. 1A/B, pp. L107-L109 (1993).

Byon, Eungsun, et al., "Coalescence of Nanometer Silver Islands on Oxides Grown by Filtered Cathodic Arc Deposition", Applied Physics Letters, vol. 82, No. 10, pp. 1634-1636 (2003).

Qian, Wen, et al., "Low Temperature Synthesis of Carbon Nanospheres by Reducing Supercritical Carbon Dioxide with Bimetallic Lithium and Potassium", Carbon, vol. 44, Issue 7, pp. 1303-1307 (2006).

Ng, K.W., et al., "Kinetics of MgO Chlorination with HCl Gas", Metallurgical and Materials Transactions B, vol. 36, No. 3, pp. 405-409 (2005).

Sutter, Peter W. et al., "Epitaxial Graphene on Ruthenium", Nature Materials, vol. 7, No. 5, pp. 406-411 (2008).

Wang, W.H. et al., "Growth of Atomically Smooth MgO Films on Graphene by Molecular Beam Epitaxy", Applied Physics Letters, vol. 93, No. 18, pp. 183107-1-183107-3 (2008).

Chen, Q.W, et al., "Reduction of Carbon Dioxide by Magnetite: Implications for the Primordial Synthesis of Organic Molecules", Journal of the American Chemical Society, vol. 122, No. 5, pp. 970-971 (2000).

Tamaura, Yutaka, et al., "Complete Reduction of Carbon Dioxide to Carbon Using Cation-Excess Magnetite", Nature, vol. 346, Issue 6281, pp. 255-256 (1990).

Rao, Gopalakrishna M., "Electrolytic Production of Magnesium: Effect of Current Density", Journal of Applied Electrochemistry, vol. 16, No. 5, pp. 775-780 (1986).

Wallevik, Oddmund, et al., "Magnesium Electrolysis—A Monoplar Viewpoint", Magnesium Technology 2000, pp. 13-16 (1999).

American Chemistry Council, "Magnesium Chloride: Source of Magnesium for Alloys", http://chlorine.americanchemistry.com/Science-Center/Chlorine-Compound-of-the-Month-Library/Magnesium-Chloride-Source-of-Magnesium-for-Alloys, accessed Aug. 16, 2011.

Halmann, M., et al., "Magnesium Production by the Pidgeon Process Involving Dolomite Calcination and MgO Silicothermic Reduction: Thermodynamic and Environmental Analyses", Industrial & Engineering Chemistry Research, vol. 47, No. 7, pp. 2146-2154 (2008).

Rao, Anand, B., et al., "A Technical, Economic and Environmental Assessment of Amine-based CO2 Capture Technology for Power Plant Greenhouse Gas Control", Environmental Science Technology, vol. 36, Issue 20, pp. 4467-4475 (2002).

Figueroa, Jose D., et al., "Advances in CO2 capture technology—The U.S. Department of Energy's Carbon Sequestration Program", International Journal of Greenhouse Gas Control, vol. 2, Issue 1, pp. 9-20 (2008).

Haefeli, Susanne, et al., "Carbon Dioxide Capture and Storage Issues-Accounting and Baselines Under the United Nations Framework Convention on Climate Change (UNFCCC)", IEA Information Paper, International Energy Agency, 36 p. (2004).

Kim, Do Kyung, et al., "Spinel LiMn2O4 Nanorods as Lithium Ion Battery Cathodes", Nano Letters 2008, vol. 8, No. 11, pp. 3948-3952 (2008).

Jo, Minki, et al., "Nanoparticle-Nanorod Core-Shell LiNi0.5Mn1.5O4 Spinel Cathodes with High Energy Density for Li-Ion Batteries", Journal of the Electrochemical Society, vol. 157, No. 7, pp. A841-A845 (2010).

Fey, George Ting-Kuo, et al., "MgAl2O4 Spinel-Coated LiCoO2 as Long-Cycling Cathode Materials", Journal of Power Sources, vol. 146, Issues 1-2, pp. 245-249 (2005).

Shaju, K. M., et al., "Li Ion Kinetics Studies on Spinel Cathodes, Li(M1/6Mn11/16)O4 (M=Mn, Co, CoAl) by GITT and EIS", Journal of Materials Chemistry, vol. 13, Issue 1, pp. 106-113 (2003).

Liu, J., et al., "Improved Spinel Lithium Manganese Oxide as Cathode for High Power for Battery HEV Application", Electrochemical Society, Meeting Abstract 135, http://www.electrochem.org/dl/ma/202/pdfs/0135.PDF (2002).

Lee, Jeong K., et al., "Silicon Nanoparticles-Graphene Paper Composites for Li Ion Battery Anodes", Chemical Communications, vol. 46, Issue 12, pp. 2025-2027 (2010).

Stipe, Christopher B., et al., "Soot Particle Disintegration and Detection Using Two Laser ELFFS", Lawrence Berkeley National Laboratory, LBNL Paper LBNL-56636, http://www.escholarship.org/uc/item/9h65b3xb (2004).

He, Hong, "Nanocomposite Catalysts for Soot Combustion and Propane Steam Reforming", Massachusetts Institute of Technology, http://dspace.mit.edu/handle/1721.1/39347 (2007).

* cited by examiner

PROCESS FOR THE PRODUCTION OF CARBON GRAPHENES AND OTHER NANOMATERIALS

RELATED APPLICATIONS

This is a continuation-in-Part of Application No. 13/090,053, filed Apr. 19, 2011 now U.S. Pat. No. 8,377,408, and is also based upon Provisional Application No. 61/385,087, filed Sep. 21, 2010, the priority of which is claimed.

BACKGROUND OF THE INVENTION

1. Field of Invention

This invention pertains generally to the production of nanomaterials and, more particularly, to the production of carbon graphenes and other nanomaterials.

2. Related Art

Nanomaterials is an emerging new field to which major efforts in research and development are being applied. The characteristics of nanomaterials can differ significantly from those of conventional materials in a number of respects that may be important to applications in many fields, including the medical field, semiconductors, energy storage, advanced composites, electronics, and catalytics. Many nanomaterials can be used in ways that exploit their quantum-mechanical properties.

Recently, significant research and interest have been focused on graphenes. Graphenes are allotropes of carbon in the form of one atom thick sheets of carbon atoms densely packed in a hexagonal honeycomb crystal lattice. Graphenes have a number of unique and desirable qualities, including extraordinary surface area, electrical conductivity and capacitance, thermal and mass transfer capability, magnetic properties, and extraordinary values of tensile strength and modulus of elasticity. These attributes, individually or in combination, are projected to make carbon graphene structures applicable to a number of important technologies and markets, including electrolytic storage media for lithium ion batteries and ultra capacitors, facilitated transport membranes for micro filtration, catalysis as substrate material, heat transfer for light-emitting diodes (LEDs) and other applications, high frequency semiconductors for computing, hydrogen storage, conductive materials for flatscreen and liquid crystal displays (LCDs), and strengthening agents for advanced materials in wind turbines and automobiles. IBM has demonstrated a 100 gigahertz graphene transistor and stated that a 1 terahertz transistor graphene is conceivable.

There are a number of known methods for producing graphenes, including chemical vapor deposition, epitaxial growth, micro-mechanical exfoliation of graphite, epitaxial growth on an electrically insulating surface, colloidal suspension, graphite oxide reduction, growth from metal-carbon melts, pyrolysis of sodium ethoxide, and from nanotubes. Each of these methods has well documented advantages and disadvantages. A general advantage of many of the processes is the ability to produce relatively pure graphene materials and, in some cases, large continuous surface graphene materials. Processes such as epitaxial growth and colloidal suspension may lead to the customization of graphene materials to suit very specific requirements.

There are also a number of known methods for producing other forms of carbon nanomaterials such as nanospheres, fullerenes, scrolls and nanotubes, including, for example, the use of carbon arc and laser technologies.

To date, however, no process for the production of carbon nanomaterials has been successfully commercialized, despite many serious efforts to do so, particularly with respect to carbon nanotubes. Therefore, there is justified concern that commercial production of graphenes may also be difficult to realize. All of the known graphene formation processes have significant limitations and disadvantages, including the dependency on relatively scarce highly crystalline graphite as feedstock, high cost, and limited scalability. Because of these limitations, the known methods may not be capable of providing a dependable supply of low cost graphenes with high volumes of production.

The invention is based upon an extremely robust and scalable reaction in which the preferred reagents or feedstock are carbon dioxide ($CO_2$) and magnesium (Mg).

When carbon-based fuels such as coal, oil, and natural gas are variously combusted to generate heat, substantial amounts of $CO_2$ and other combustion products are produced, and there is widespread concern about the historically high and increasing amounts of $CO_2$ in the atmosphere. Scientists believe the unusually high levels of $CO_2$ in the atmosphere could cause or are already causing adverse global climate effects and acidification of the oceans. While a number of solutions have been proposed for the reduction of $CO_2$ emissions, the dominant model in publications and public policy debate involves capture of the $CO_2$ by one or another of several chemical mechanisms, followed by compression of the captured $CO_2$ and, finally, disposition of the $CO_2$ as a waste product by injection (sequestration) into the earth. Since the capture of $CO_2$ from fossil fuel emissions is costly and energy intensive, it would be desirable if at least some of the captured $CO_2$ be put to productive use rather than be treated as a waste product. An economically feasible, large scale, and profitable process for reduction of $CO_2$ to carbon products would create demand for captured $CO_2$ and reduce the requirement for sequestration of $CO_2$.

There are a number of known methods for the reduction of $CO_2$. One such process is photosynthesis, which is a widely appreciated and prolific $CO_2$ reduction mechanism that reduces $CO_2$ to carbon that is then used by the living system to produce complex organic molecules which are necessary for life. However, photosynthesis has the disadvantage of being difficult to replicate in technical or man-made biologic systems.

Ferrous Oxides, including magnetite and several other similar mineral compounds, have also been found to beneficially reduce $CO_2$ to an amorphous form of carbon. Likewise, liquid potassium has been found to beneficially reduce $CO_2$ to amorphous carbon. In addition, there are a number of partial reduction (mineralization) processes in which $CO_2$ is converted to carbonates. Partial reduction approaches are currently considered more likely than full reduction of $CO_2$ to carbon to be feasible alternatives to sequestration because full reduction of $CO_2$ is generally believed to be steeply endothermic and, therefore, economically challenging. However, partial reduction approaches have the disadvantage of producing materials for which the market prices are relatively low.

In sum, previously known $CO_2$ reduction methods are limited practically and economically by one or more factors, including cumbersome mass flow requirements, significant energy requirements, high cost of reactants, difficult or risky materials management, and/or low value of the end products, with the value of the products often being less than the cost of producing them.

Magnesium is not presently found in nature in pure form and must be produced by one or more well-known methods from one or more of its natural existing forms, which include magnesium chloride and magnesium oxide. Magnesium is frequently produced from seawater where it resides naturally as the second most abundant cation. In this production process, the Mg is precipitated with calcium hydroxide, and the precipitant is reacted with HCl and finally reduced to magnesium by electrolysis. Other processes, including the Pidgeon process, which utilize heat to reduce mined magnesium rich ore, are employed to produce relatively pure magnesium. However, these processes are relatively expensive and do not always produce the level of purity desired.

OBJECTS AND SUMMARY OF THE INVENTION

It is, in general, an object of the invention to provide a new and improved process for the production of carbon graphenes and other nanomaterials.

Another object of the invention is to provide a process of the above character which overcomes the limitations and disadvantages of techniques heretofore employed in the production of nanomaterials.

These and other objects are achieved in accordance with the invention by combusting reactants together in a highly exothermic oxidation-reduction reaction which produces high energy and heat at a temperature of approximately 5610° F., or higher, then rapidly cooling products of the reaction to form nanoparticles, and then separating nanoparticles of different materials from each other.

In some of the preferred embodiments, the high heat is produced by an oxidation-reduction reaction of carbon dioxide and magnesium as the primary reactants. Additional materials such as reaction catalysts, control agents, or composite materials can be included in the reaction, as desired. The reaction is capable of producing nanomaterials from a variety of input materials. The carbon dioxide and magnesium are combusted together in a reactor to produce nano-magnesium oxide, graphenes, graphene composites, and, if desired, other nanoproducts which are then separated or excluded by suitable processes or reactions to provide the individual reaction products.

By varying the process parameters, such as reaction temperature and pressure, the type and morphology of the carbon nanoproducts and other nanoproducts can be controlled.

The Mg—$CO_2$ reaction is highly energetic, producing very high temperature on the order of 5610° F. (3098° C.), or higher, and also produces large amounts of useful energy in the form of heat and light, including infrared and ultraviolet radiation, all of which can be captured and reused in the invention or utilized in other applications. The products of combustion, particularly the magnesium oxide, can be recycled to provide additional oxidizing agents for combustion with the carbon dioxide.

The reaction products include novel nanocrystals of MgO (perclase) and $MgAl_2O_4$ (spinels) as well as composites of these nanocrystals with multiple layers of graphene deposited on or intercalated with them.

DETAILED DESCRIPTION

Overview

Figure 1:
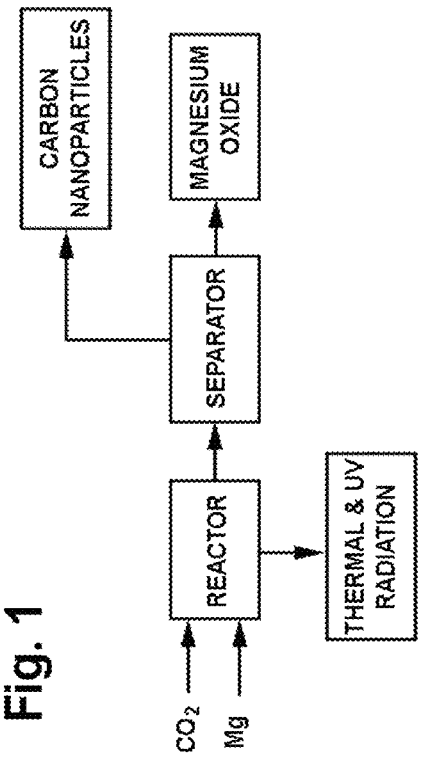
FIG. 1 is a flow diagram of one embodiment of a process for the production of carbon graphenes and other nanomaterials in accordance with the invention.

In the invention, an oxidizing agent such as $CO_2$ is combusted with a reducing agent such as magnesium in a high temperature reactor to form various nanoscale products such as graphenes, graphene composites, MgO, and other nanomaterials. Thus, as illustrated in FIG. 1, the $CO_2$ and magnesium are introduced into a reactor where a combustion reaction occurs, producing a heterogeneous mixture of nanoscale materials consisting primarily of carbon and MgO nanoparticles. The reaction produces intense amounts of energy including heat at a temperature of 5610° F. (3098° C.), or higher, infrared radiation, visible light, and ultraviolet electromagnetic radiation, all of which can be captured and utilized. The carbon and magnesium oxide are then separated from each other and from any other reaction products that may be present in an integrated set of process steps such as annular flow separation, cyclone separation, gravity cell separation, flotation separation, centrifugal separation, acid washing, de-ionized water washing, ultrasonic processing, elevated temperature treatment in a vacuum, and/or other suitable separation processes. The heat produced by the reaction is recovered for use in the separation steps and in purifying the reaction products, and the UV radiation and other energy produced by the reaction can be recovered for other uses. The chemistry, temperature of reaction, rate of cooling, pressure, input materials and gases and other parameters are controlled to determine the quality, character and morphology of the reaction products. All or part of the MgO product is recycled to provide highly purified magnesium for use in the reaction.

The products produced by the invention are determined by the control of variables in all phases of the process, i.e. pre-reaction, during the reaction, and post reaction. For example, the introduction of additional materials to the reaction has been found to result in the production of nano-forms and composites of the added materials, varying the reaction temperature and gradient has been found to influence the morphology of the reaction products, and varying the separation and purification treatment has been demonstrated to significantly alter the constituency of the products.

The invention has been found to produce a novel intercalated or multilayered graphene-magnesium oxide composite as well as nanoscale MgO particles in various forms, including periclase, or crystalline MgO. Other materials present in the reaction can also be converted to nanomaterials or composites. For example, when aluminum is present as an alloy material in the magnesium, the invention produces nano-spinels (crystalline $MgAl_2O_4$). Other oxidizing agents can be introduced to the reaction as inputs with the feedstock to produce new composite or single-component nanostructures. In addition, non-reactant materials such as silicon, silver, gold, copper, and iron can be introduced into the reaction to produce nano forms of those materials, graphenes decorated with those materials, and graphene composites and other nano composites of them.

The magnesium-$CO_2$ reaction is highly exothermic and produces a high energy flux across the electromagnetic spectrum, including very high temperature in the range of 5610° F. (3098° C.). The invention includes process controls and systems for preserving the intense energy of the reaction, including management, capture, and reuse that energy to improve the operational and economic efficiency of the process. The heat from reaction can be used for product separation and purification and in converting the MgO to magnesium for recycling in the process, or for sale for use in the production of electricity or for other uses. Ultraviolet energy produced by the reaction is also captured and used.

Recycling most or all of the MgO product for use in the reaction not only keeps the cost of the feedstock down, but also minimizes impact on the market for magnesium, particularly when the invention is operated at large scale. It is also significant in view of the limited capacity to produce magnesium from mined sources. In one presently preferred embodiment, for example, the MgO product is reduced to magnesium by electrolysis, which is a relatively low-cost, energy efficient process compared to conventional techniques for producing magnesium.

The products of the invention include nanoscale materials such as carbon graphenes and MgO nanoparticles and, if desired, novel graphene composites and other nanomaterials. The invention can also produce non-carbon nanomaterials such as spinels and novel intercalated or layered graphene-periclase and graphene-spinel composite materials, and it is believed to be capable of producing many other forms of nanomaterial as well. In addition, as noted above, non-reactive substances such as silver or silicon can be introduced to the reaction to produce nano-silver, nano-silicon, silver or silicon decorated graphenes, silver- or silicon-graphene composites, and other silver or silicon nano composites. Two forms of nanocrystals produced by the invention are spinels (crystalline $MgAl_2O_4$) and perciclase (crystalline MgO). In addition, composites of these nanocrystals with multiple layers of graphene deposited on them or intercalated with them have also been produced. In such composites, the layers are in the range of one nanometer or less apart and are held together by Van der Waals forces. The graphene-periclase and graphene-spinel nano-composites are believed to be novel materials.

While the exothermic reaction of $CO_2$ and magnesium is utilized in the preferred embodiment, the heat can be supplied by other sources such as other exothermic chemical reactions, a high temperature nuclear reactor, a solar furnace, an electric arc, magneto hydrodynamic heating of plasma, combustion of hydrogen or other fuel, or by other suitable means. Likewise, the initial reactant for producing graphenes can be any carbon containing molecule such as carbon dioxide, carbon monoxide, phosgene ($COCl_2$), methane, ethylene, acetylene, other carbon containing material, and combinations thereof. Similarly, other earth metals such as aluminum, titanium, zinc, sodium, lithium, calcium, and combinations thereof can be used as the reducing agent.

Preferred Embodiments

Figure 2:
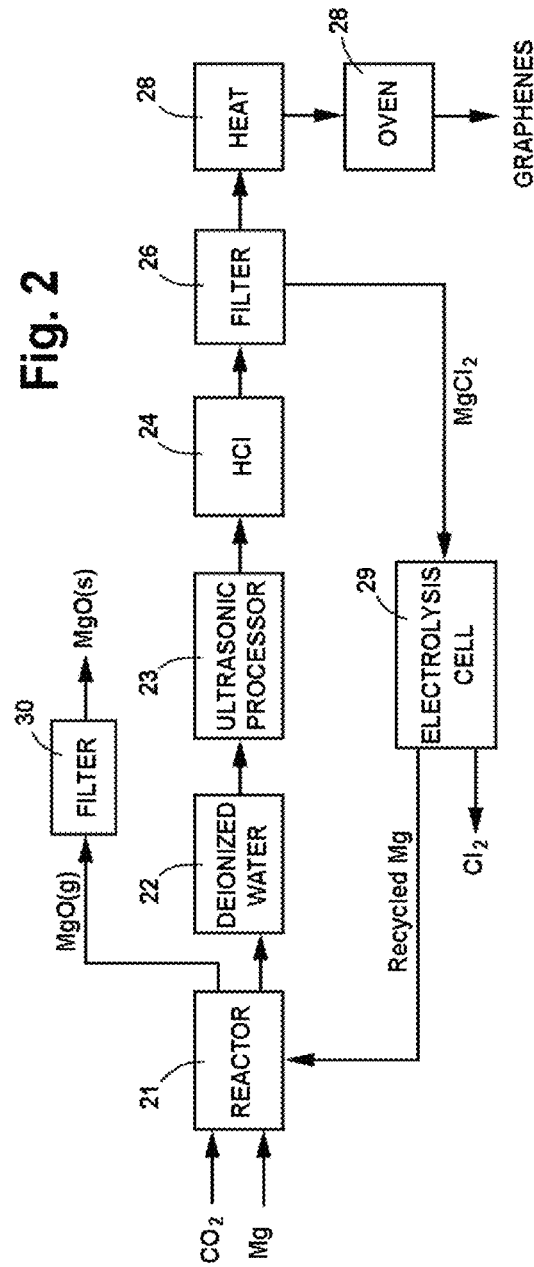
FIG. 2 is a flow diagram of another embodiment of a process for the production of carbon graphenes and other nanomaterials in accordance with the invention.

In the embodiment illustrated in FIG. 2, $CO_2$ and magnesium are introduced into a high temperature reactor 21 where they are combusted together in a highly exothermic oxidation-reduction reaction which produces high energy and heat at a temperature on the order of 5610° F. (3098° C.), or higher, while producing a homogeneous reaction product consisting of magnesium oxide (MgO) and carbon in accordance with the relationship:

$$2Mg(s)+CO_2(g) \rightarrow 2MgO(s)+C(s).$$

The homogeneous reaction product is cooled rapidly by beneficial expansion of the superheated reaction products or by additional active cooling to quench and retain the nano-particle structure and then wetted in a bath of de-ionized water 22. This results in the wetting of the nanocarbon graphene and nano MgO reaction products, with some of the MgO reacting with the water to form magnesium hydroxide ($Mg(OH)_2$):

$$MgO(s)+H_2O(l) \rightarrow Mg(OH)_2.$$

The mixture is then treated with an ultrasonic probe 23, operating, for example, at a frequency of 20 kilohertz and a power level of 500 watts, to break up the heterogeneous reaction product into smaller particles, exposing more surface area for subsequent treatment or processing.

Hydrochloric acid (HCl) 24 is added to the ultrasonically treated mixture. The carbon graphenes are inert to HCl, but the HCl reacts with unreacted magnesium in the mixture as well as the dissolved MgO and $Mg(OH)_2$ to form magnesium chloride ($MgCl_2$) and water ($H_2O$):

$$Mg(OH)_2(s)+2HCl(l) \rightarrow MgCl_2(s)+2H_2O(l).$$

After the reaction products have been treated with HCl, the solution is filtered using a Büchner vacuum funnel 26 with 2.5 micron filter paper, with the graphenes being deposited onto the filter paper and the $MgCl_2$ passing through. The filter paper and graphenes are then heated, in a first heating stage 27, to a temperature of 93° C. to dry the graphenes and facilitate their removal from the filter paper.

In order to fully remove any oxide attached to or co-mingled with the graphenes, the graphenes are placed in a seasoned quartz boat and heated in a seasoned quartz tube oven 28 under vacuum at a temperature of 1150° C. for a predetermined time. This step is repeated until the graphenes have reached a desired level of purity, with successive repetitions providing a linear reduction in the magnesium contamination of the graphene product.

The $MgCl_2$ from filter 26 is processed by electrolysis in a cell 29 to separate the magnesium from the chlorine:

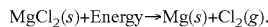

$$MgCl_2(s) + Energy \rightarrow Mg(s) + Cl_2(g).$$

The magnesium is recycled to reactor 21 for use in the $Mg-CO_2$ reaction, and the chlorine can be recycled or sold.

Magnesium oxide vented from the reactor is captured and processed by filtration 30 to recover MgO nanoparticles.

Figure 3:
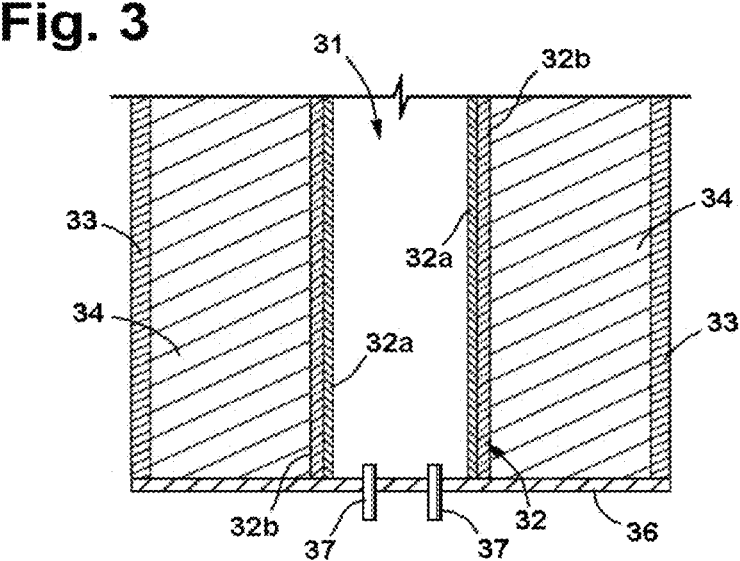
FIG. 3 is a vertical sectional view of one embodiment of a reactor for carrying out the process of the invention.

The reaction is preferably carried out in a heavily insulated, externally cooled reactor, one embodiment of which is shown in FIG. 3. This reactor has an upright, open-ended reaction chamber 31 with an inner cylindrical side wall 32, an outer side wall 33, insulation 34 between the walls, and a floor 36. The inner wall is a double wall structure with an inner layer or section 32a fabricated of a material that will withstand reaction temperatures on the order of 5610° F. (3098° C.) or higher and not introduce impurities into the reaction and an outer layer or section 32b fabricated of an insulative material that can also withstand the high temperatures produced by the reaction. The inner layer or section can, for example, be fabricated of a mixture of zirconia and rare earth oxides, graphite, or another suitable material that is compatible with high temperatures. Outer wall 33 is fabricated of metal and is liquid-cooled to lower the local temperature and collect waste heat. Ports such as inlet ports 37, 37 provide communication with the interior of the reaction chamber and permit a controlled introduction of feedstock or reagents, inert gases, other materials and gases, and sensors into the reaction chamber. Other ports (not shown) provide a controlled withdrawal of reaction product from the chamber.

The $CO_2$ atmosphere in the reactor provides an oxygen-free environment that prevents combustion of the graphene, other reaction products, and the graphite reactor walls. At the outlet end of the open-ended reactor, the $CO_2$ gas zone allows the carbon products additional time to cool below ignition temperature. Magnesium metal particles for the reaction can injected into the reactor in an argon gas stream, and the argon can also be used to provide a barrier to keep other potentially reactive gasses such as oxygen or nitrogen out of the combustion reaction.

The reactor can be operated either in a batch mode or in a continuous mode. Batch processing has been found to allow for significant control of reaction parameters including, for example, time of reaction, and may be preferable for certain end product objectives. However, a continuous process generally provides a larger product yield in a shorter period of time and may, therefore, be the preferred mode in many applications.

In the batch mode, gaseous MgO is beneficially ejected from the reaction chamber, and the other reaction products are separated outside the chamber, with the reaction product entering the separation process as a heterogeneous mix, as in the embodiment of FIG. 2.

Figure 4:
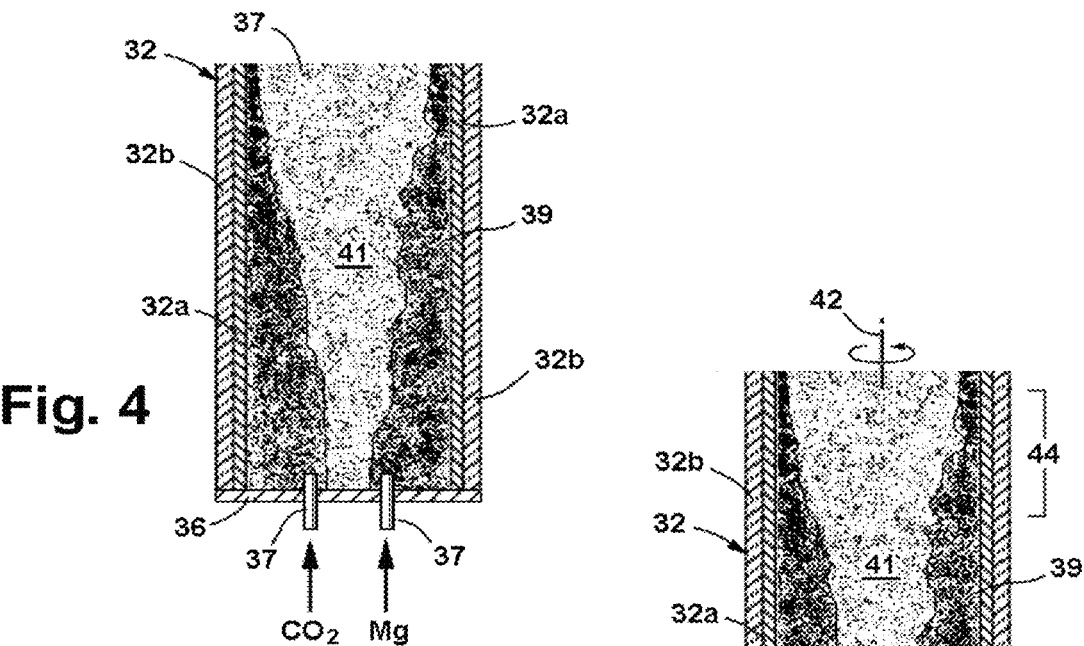
FIG. 4 is a vertical sectional view of the reaction chamber in the embodiment of FIG. 3 operating as a continuous annular flow combustor.

In the continuous mode, initial separation of the reaction products occurs in the reaction chamber, as seen, for example, in FIG. 4. Here, the reactor is shown as operating as a continuous annular flow combustor, with initial separation of the carbon and magnesium oxide reaction products occurring in an annular flow process. In this embodiment, $CO_2$ gas and solid magnesium particles are fed into the lower portion of the chamber and ignited with an electric arc or a hydrogen-oxygen flame to produce an upwardly directed annular flow of fluidized $CO_2$, magnesium oxide, and reaction particles, with a high density annular flow component 39 in the outer portion of the chamber and a lower density annular flow component 41 in the inner region. As the flow progresses upwardly, the inner region and the boundary between the two regions expand outwardly, with the particles of greater density being concentrated near the side wall of the chamber toward the top of the reaction zone. Although the reactor is shown with a vertical orientation and an upward flow, the reactor can be inverted and have the flow in a downward direction, or it can be oriented horizontally and have a horizontal flow, if desired.

Ignition of the $CO_2$ and Mg is initiated by the electric arc or flame at the base of the reaction chamber, and the conical shape of the inner flow zone results from the action of the particles in the $Mg-CO_2$ reaction. Thus, as noted above, there is an upward flow of high density, heated nanocarbon and magnesium oxide particles in the outer portion of the chamber and an upward flow of low density, heated nanocarbon and magnesium oxide particles in the inner region, with the inner region expanding outwardly as the flows progress upwardly. As the reaction products travel upward through the annular flow zone, they also may acquire a rotational component of velocity either naturally or from fixed vanes that further aid in the separation process. Thus, as illustrated, the upward flow of high density, low rotational velocity, lower temperature nano-carbon particles and magnesium oxide particles occurs in the outer portion of the chamber, while the upward flow of high rotational velocity, low density, very hot nano carbon particles and magnesium oxide particles occurs in the inner-most region. The length or height of the reaction chamber is sufficient to allow cooling of the C/Mg material before it leaves the reactor.

The result is an initial stage separation process integrated within the reactor that aids in separation of fluids or slurries as a function of fluid density. The MgO vapor beneficially rises to the top of the chamber and can be collected, for example, with a partial vacuum, a cooling system, and a receptacle. Vent ports at the top of the reaction chamber can be utilized to further facilitate the beneficial collection of pure MgO. After leaving the reaction chamber, the reaction products are further separated and treated to further prepare them for sale and recycling. Management and control of the temperature, locus and duration of the reaction will determine the final composition of the materials produced by the reactor combustion process.

Figure 5:
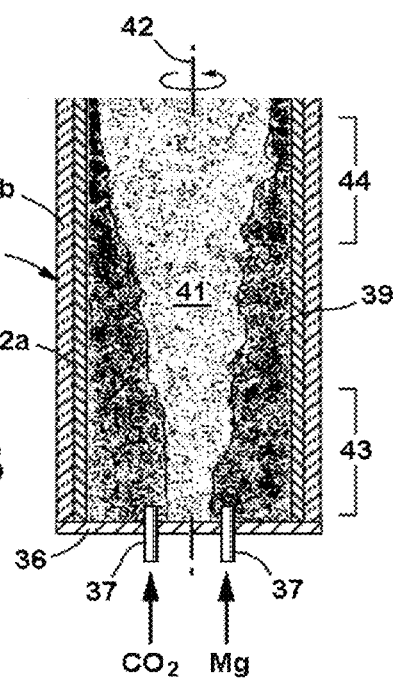
FIG. 5 is a vertical sectional view of the reaction chamber in the embodiment of FIG. 3 operating as a centrifugal separator.

Rotating the reaction chamber about its central axis 42, as illustrated in FIG. 5, provides centrifugal separation of the reaction products as they flow upwardly through the reaction zone. In the lower region 43 of the zone, there is an upward flow and flux of carbon nanoparticles, MgO, and other reaction products at relatively low rotational velocity and temperature, with higher and lower density particles interspersed both in the inner portion 41 and in the outer portion 39 of the region. By the time the particles reach upper region 44 of the chamber, they have acquired a much higher rotational velocity, and they are very hot, with the particles of higher density being concentrated in the outer region near side wall 32 and the particles of lower density in the inner region.

Figure 6:
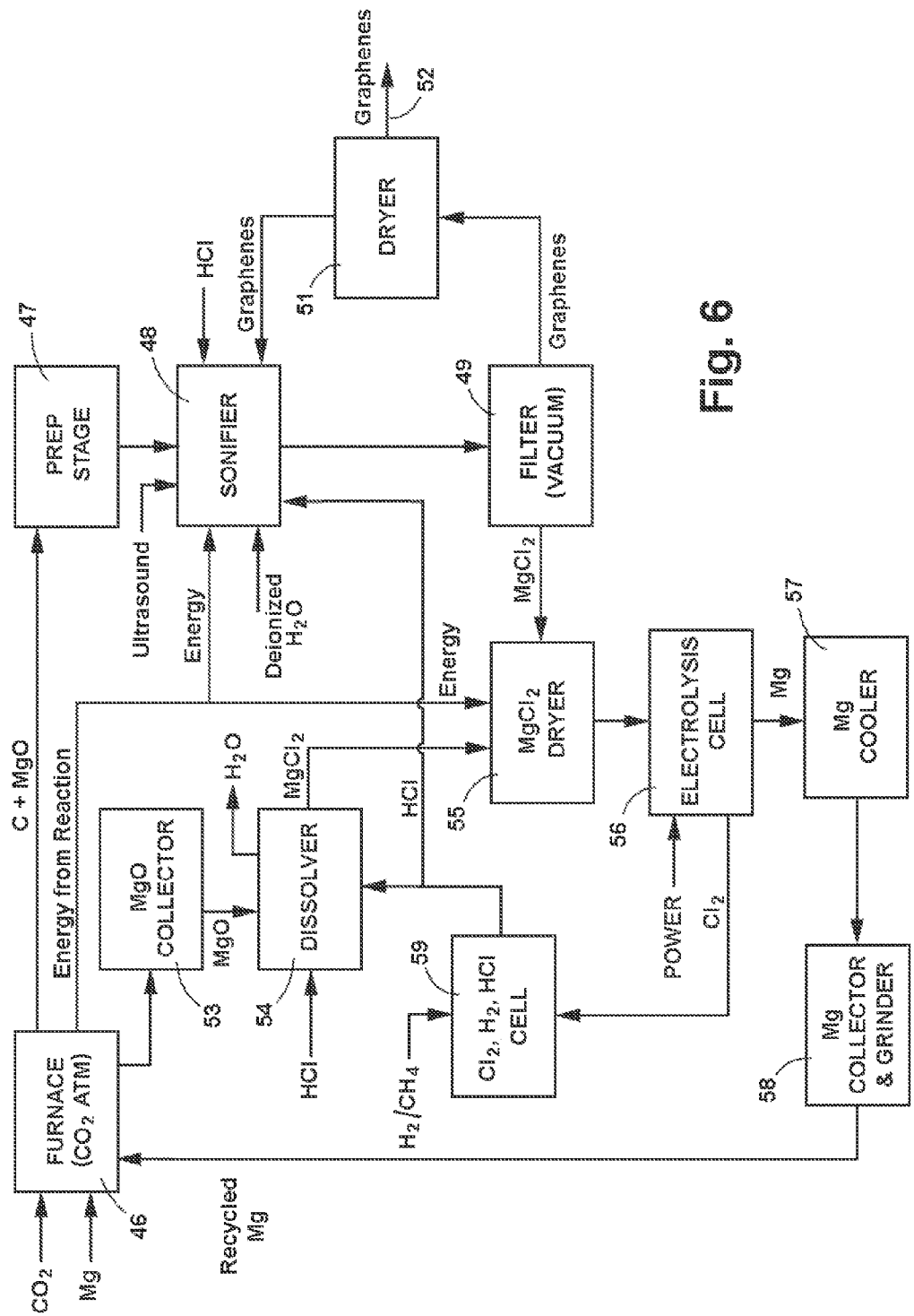
FIG. 6 is block diagram of one embodiment of a system for carrying out the process of the invention.

In the batch process illustrated in FIG. 6, $CO_2$ and magnesium are introduced into a reactor furnace 46 where they are combusted together in a highly exothermic oxidation-reduction reaction, as discussed above, producing a mixture of carbon and magnesium oxide (MgO) products which are delivered to a preparation stage 47 where they are ground into finer particles and prepared for further processing. These particles are processed ultrasonically in deionized water in a sonifier 48, then washed in hydrochloric acid (HCl). The carbon graphenes are inert to HCl, but the HCl reacts with unreacted magnesium in the mixture as well as the dissolved MgO and $Mg(OH_2)$ to form magnesium chloride ($MgCl_2$) and water ($H_2O$).

The aqueous solution of carbon graphenes and $MgCl_2$ is filtered in a vacuum filter 49 to separate the graphenes from the $MgCl_2$. The graphenes are dried in a dryer 51 and recycled back through the sonification, filter, dryer, and heating stages to further purify them. The number of times the graphenes are recycled is determined by the level of purity desired, and is typically on the order of three or four times per cycle batch. When the purification process is completed, the graphenes are discharged through a product line 52.

Magnesium oxide (MgO) produced by the Mg—$CO_2$ reaction is collected and converted to magnesium which is recycled for use in the reaction. Thus, gaseous MgO from the reactor is collected and solidified in a collector 53, then washed with HCl and converted to $MgCl_2$ in a dissolver 54. This $MgCl_2$ is dried in a dryer 55 along with the $MgCl_2$ that was separated from the carbon graphenes in filter 49. The dried $MgCl_2$ is then separated into magnesium and chlorine by electrolysis in a cell 56. The magnesium is cooled in a cooler 57, then collected and ground into finer particles, e.g. 400 Mesh, in a collector and grinder 58. The magnesium particle from the grinder are fed back to reactor 46 and used in the combustion process. Although grinding is used in this particular embodiment, the magnesium can also reduced to finer particles by other means such as cutting or cooling small droplets from a melt.

In addition to the reaction products, the combustion of $CO_2$ and magnesium also produces substantial amounts of heat and energy which are captured and utilized in other steps of the process, such as sonification and drying, or otherwise.

Chlorine, hydrogen, and HCl utilized in the process are provided by a cell 59 to which hydrogen ($H_2$) and methane ($CH_4$) are supplied along with the chlorine from electrolysis cell 56.

Figure 7:
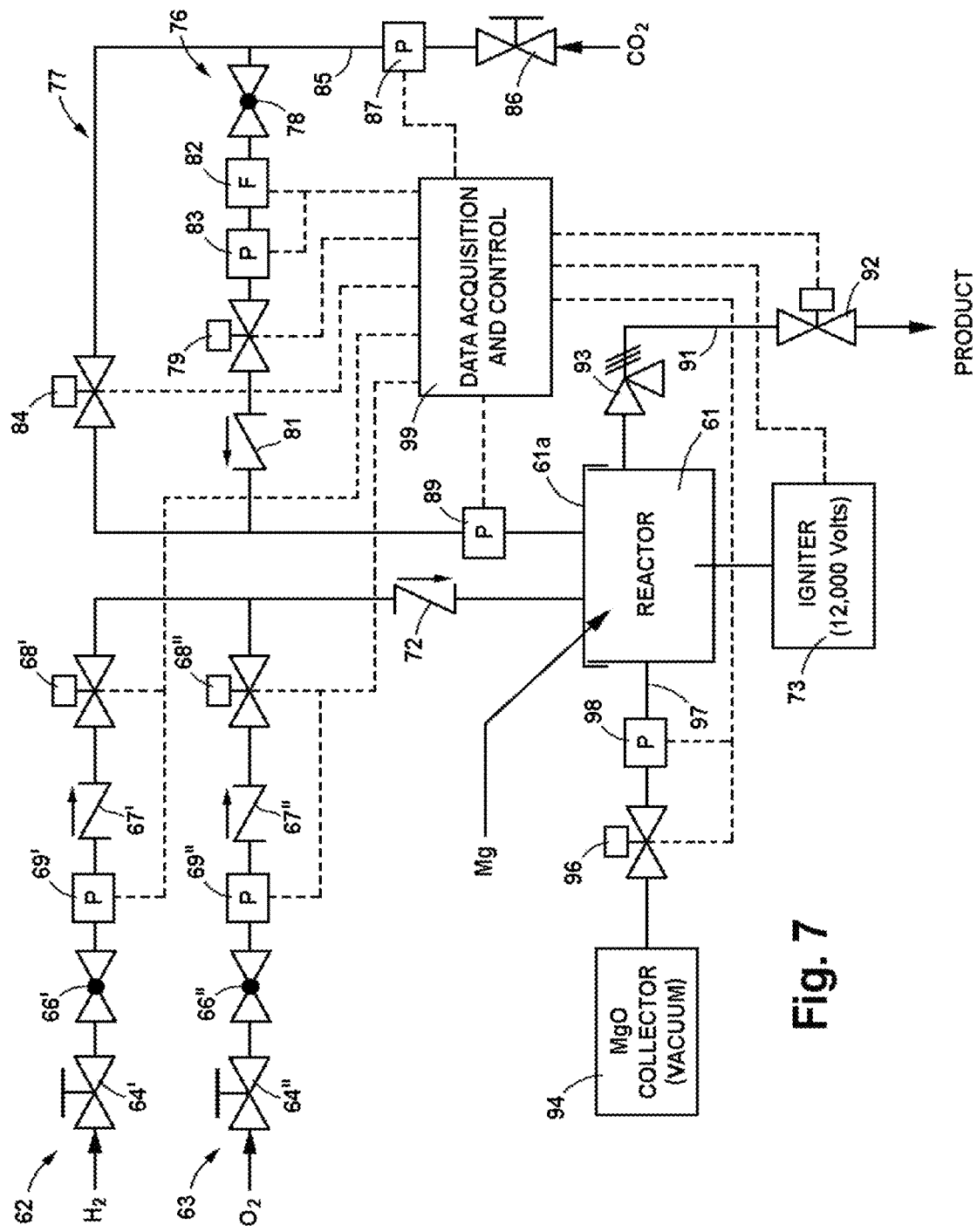
FIG. 7 is block diagram of another embodiment of a system for carrying out the process of the invention.

FIG. 7 illustrates another embodiment of a batch process in which ignition of the $CO_2$ and magnesium is initiated by a hydrogen-oxygen flame. The hydrogen and oxygen are supplied to a reactor 61 through branches 62, 63, each of which includes a shut-off valve 64, a pressure reducing valve 66, a check valve 67, and an electrically operated control valve 68, designated prime in branch 62 and double prime in branch 63. Pressure in the branch lines is monitored by pressure transducers 69', 69". Hydrogen and oxygen from the branches are mixed together in and delivered to the reactor by a feed line 71 with a check valve 72 in the feed line to prevent backflow from the reactor to the branches. A high voltage spark igniter 73 for the hydrogen-oxygen mixture is located at the base of the reactor.

Means is provided for supplying $CO_2$ to the reactor at a reduced pressure level until ignition occurs and thereafter at higher pressure. This means includes a low pressure branch 76 and a high pressure branch 77. The low pressure branch has a pressure reducing valve 78, a flow control valve 79, and a check valve 81, with a flowmeter 82 and a pressure transducer 83 for monitoring flow and pressure in the branch. The high pressure branch has a control valve 84. $CO_2$ is supplied to the two branches through a supply line 85 with a shut-off valve 86 and a pressure transducer 87. $CO_2$ from the branches is supplied to the reactor through a feed line 88, with a pressure transducer 89 for monitoring the pressure of the $CO_2$ in that line.

Reactor 61 has a removable cap or lid 61a, and the magnesium particles to be combusted are poured directly into the reactor when the lid is off and the reactor is not operating.

A discharge line 91 is connected to the reactor for collecting the products of the reaction, with a control valve 92 for controlling product discharge and a pressure relief valve 93 through which gaseous products of combustion can escape in the event that the pressure in the reactor becomes too high.

A vacuum system 94 is also connected to the reactor for collecting MgO particles produced by the combustion of $CO_2$ and magnesium. A control valve 96 is included in the line 97 between the reactor and the collector, and a pressure transducer 98 monitors the pressure in the line.

Data from the pressure transducers and flowmeter is delivered to a data acquisition and control system 99 which processes the data and controls the operation of the control valves and the igniter.

To begin the process, the lid is removed from the reactor, and the Mg particles are poured into the chamber. The lid is replaced, and control valve 79 is opened to allow $CO_2$ to flow into the reactor at the reduced pressure set by regulator valve 78. Control valves 68', 68" are also opened to allow hydrogen and oxygen to flow into the reactor, and igniter 73 is turned on to ignite those gases. The hydrogen-oxygen flame ignites the Mg particles and the $CO_2$, and when they begin to burn vigorously, control valves 68', 68" are closed to shut off the flow of hydrogen and oxygen. At the same time, control valve 84 is opened to deliver the high pressure $CO_2$ to the reaction chamber, and valve 79 is closed to shut off the low pressure flow. As the reaction progresses, control valve 92 is opened to allow the discharge and collection of the reaction products through discharge line 91, and control valve 97 is opened to allow vacuum system 96 to draw gaseous MgO into the vacuum collector where the MgO particles are collected.

Figure 8:
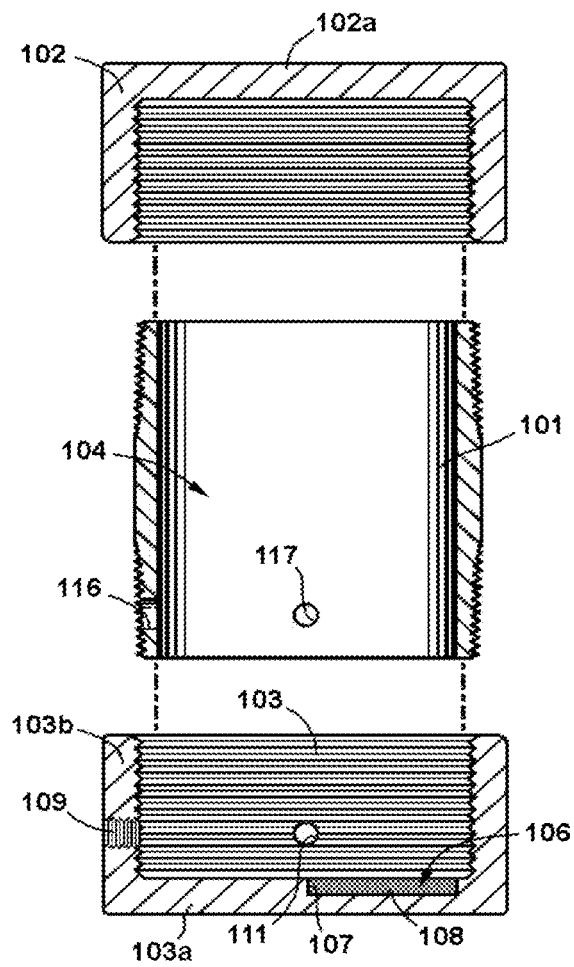
FIG. 8 is an exploded vertical sectional view of one embodiment of a high pressure $CO_2$ reactor or furnace suitable for use in the embodiment of FIG. 7.
Figure 9:
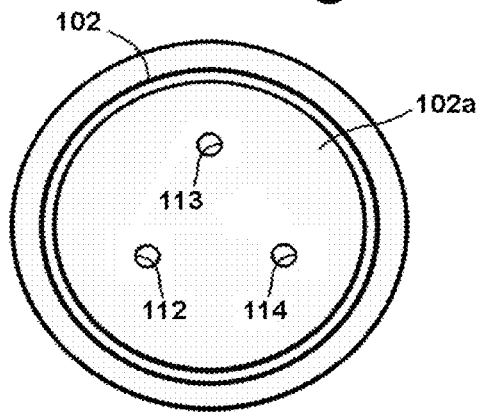
FIG. 9 is a bottom plan view of the upper end cap of the reactor in the embodiment of FIG. 8.
Figure 10:
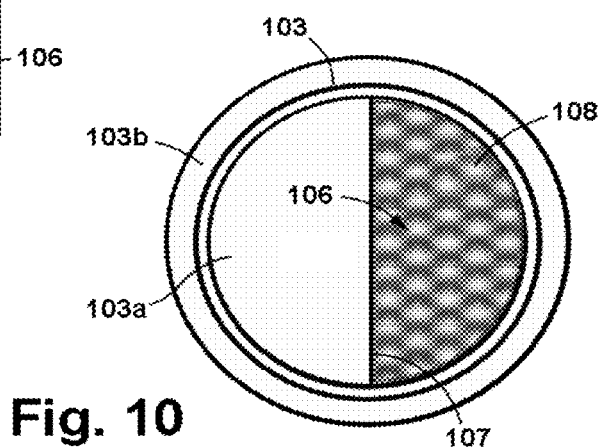
FIG. 10 is a top plan view of the lower end cap of the reactor in the embodiment of FIG. 8.

One embodiment of a high pressure $CO_2$ reactor or furnace suitable for use in the process of FIG. 7 is illustrated in FIGS. 8-10. This reactor has a cylindrical side wall 101 with end caps 102, 103 threadedly attached to the upper and lower end portions of the side wall to form a closed chamber 104. They are fabricated of a material that can withstand the extremely high temperatures of the reaction, and in the embodiment illustrated, they consist of a carbon steel pipe nipple and a pair of carbon steel pipe caps, with the length of the nipple and the outer diameter of the caps both being on the order of 5 inches.

A reactor bed 106 is provided in the bottom wall 103a of lower end cap 103. This bed consists of a ¼ inch deep pocket 107 formed in one half of the bottom wall filled with a material 108 such as zirconium dioxide ($ZrO_2$) or zirconia which can withstand the high temperatures and not introduce impurities into the reaction.

Ports are formed in the end caps to provide communication with the reactor chamber when the reactor is in use. The ports include an $H_2/O_2$ inlet port 109 and an ignition port 111 in the side wall 103b of the lower end cap, a $CO_2$ inlet port 112 in the upper wall 102a of the top cap, a product outlet port 113 in upper wall 102a for the carbon and magnesium reaction products, and another outlet port 114 in the upper wall for the gaseous MgO. These ports are threaded for connection to the lines that carry the incoming gases, the ignition conductor, and the reaction products. Clearance holes 116, 117 are formed in side wall 101 in registration with inlet port 109 and ignition port 111 in the side wall of the lower cap. In this particular embodiment, there is no port for the magnesium since it is introduced by removing the top cap and pouring the magnesium particles onto the reactor bed.

Figure 11:
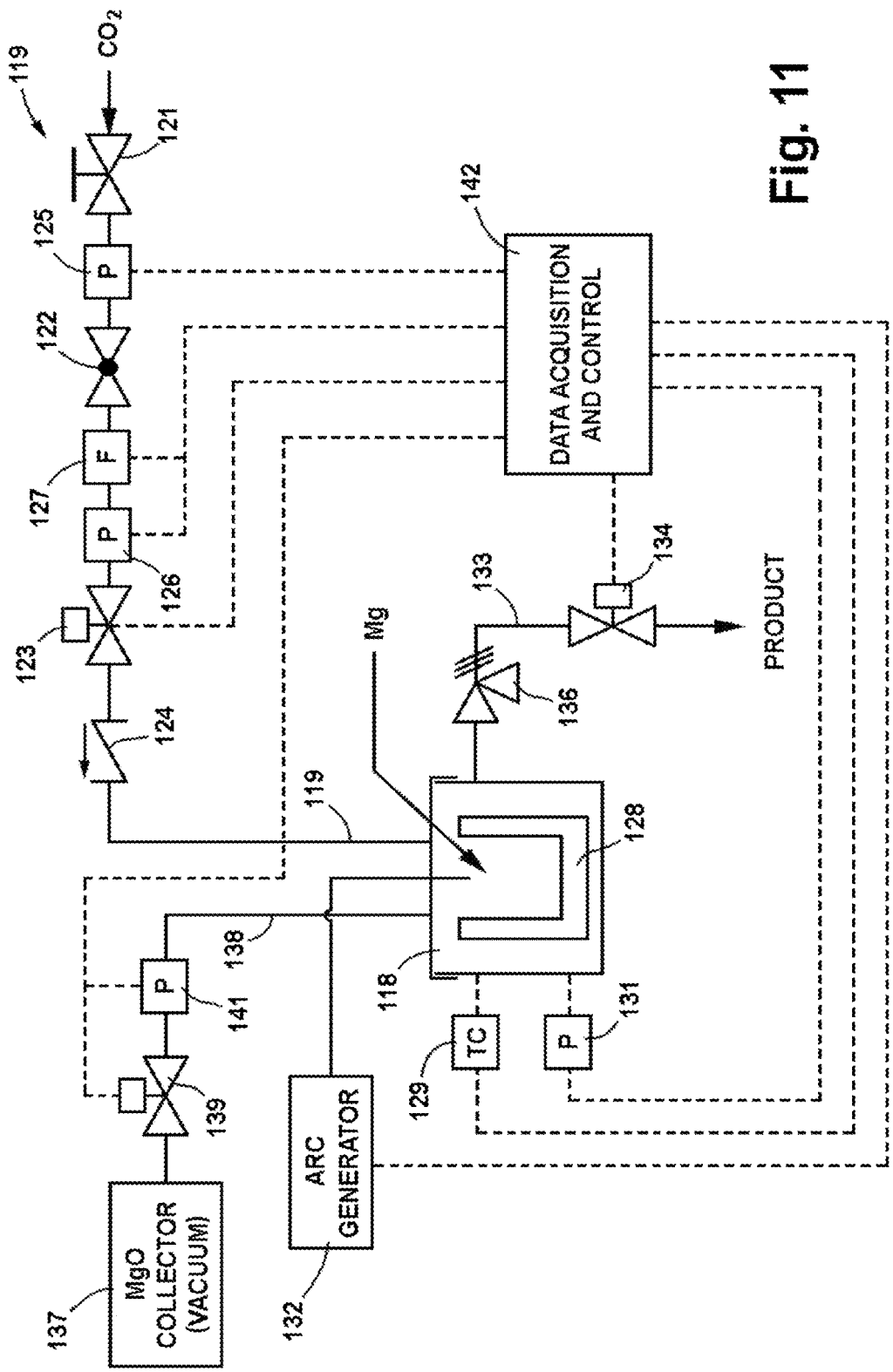
FIG. 11 is block diagram of another embodiment of a system for carrying out the process of the invention.

FIG. 11 illustrates an embodiment in which ignition of the $CO_2$ and magnesium is initiated by an electric arc. In this embodiment, $CO_2$ is supplied to reactor 118 at ambient pressure through a supply line 119 which includes a shut-off valve 121, a pressure reducing valve 122, a control valve 123, and a check valve 124, with pressure transducers 125, 126 and a flowmeter 127 for monitoring pressure and flow in the line. The reactor walls and lid are fabricated of a material, such as carbon steel, that is capable of withstanding the high temperatures produced by the reaction, and a graphite crucible 128 is disposed within the reaction chamber for holding the magnesium particles for combustion. Those particles are introduced by removing the lid and pouring them into the crucible. Temperature and pressure within the reactor are monitored by a thermocouple 129 and a pressure transducer 131.

The arc for initiating ignition of the $CO_2$ and magnesium is provided by an electric arc generator 132 which can, for example, be similar to that employed in an arc welder and have a rating on the order of 90 amperes at 40 volts AC.

As in the embodiment of FIG. 6, the reaction products are collected through a discharge line 133 which includes a control valve 134 and a pressure relief valve 136, and MgO particles are collected in a vacuum collector 137 which is connected to the reactor by an output line 138 which includes a control valve 139 and a pressure transducer 141.

Data from the pressure transducers, flowmeter, and thermocouple is delivered to a data acquisition and control system 142 which processes the data and controls the operation of the control valves and the arc generator.

Care is taken to ensure the ejected reaction products, particularly the graphenes, are not combusted post reaction by interaction of the carbon with oxygen and high heat. The presence of a $CO_2$ or similarly inert gas at the reaction exit point is maintained and high heat is drawn away from the exit point by an integrated cooling system.

The nanocarbon graphene and nano MgO reaction products have been found to be extremely consistent from batch to batch in the embodiment of FIG. 11. Also, with the gaseous $CO_2$ feedstock, this process has produced measurably and significantly less intercalated material, specifically MgO encapsulated in graphene layers, than batch processes employing solid $CO_2$ feedstock. Gaseous carbon monoxide (CO) was also investigated as an alternative feedstock in this embodiment, but the CO—Mg reaction was much less vigorous than the Mg—$CO_2$ reaction, probably due to the lesser amount of oxygen available to the reaction. CO may be useful in regulating the of the Mg—$CO_2$ reaction.

Figure 12:
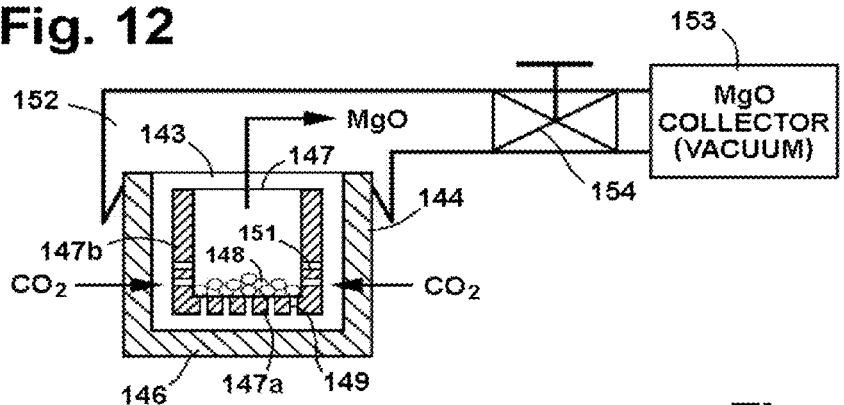
FIG. 12 is a vertical sectional view, partly schematic, of another embodiment of a reactor for use in carrying out the process of the invention.

In the embodiment of FIG. 12, low pressure $CO_2$ gas is utilized in the reaction process. This embodiment includes a reaction chamber 143 with a cylindrical side wall 144 and a bottom wall 146 fabricated of a material, such as carbon steel, which will withstand the high temperatures of the reaction. The chamber is open at the top, and a graphite crucible 147 is disposed within the chamber for holding magnesium particles 148. $CO_2$ gas is introduced into the chamber at atmospheric pressure through ports in the chamber walls and passes through slotted openings 149, 151 in the bottom and side walls 147a, 147b of the crucible.

A hood 152 is mounted on the upper portion of side wall 144 for collecting magnesium oxide (MgO) produced by combustion of the $CO_2$ and magnesium in the reaction chamber. The MgO is drawn into and through the hood by a vacuum-operated collector 153 connected to the discharge end of the hood, with a valve 154 at the discharge end for controlling when the vacuum system can draw the MgO into the collector. The hood can be removed from the chamber to allow the magnesium particles to be poured into the crucible.

Figure 13:
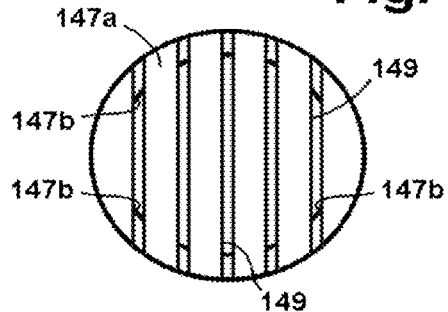
FIG. 13 is an enlarged bottom plan view of the lower wall of the reaction chamber in the embodiment of FIG. 12.
Figure 14:
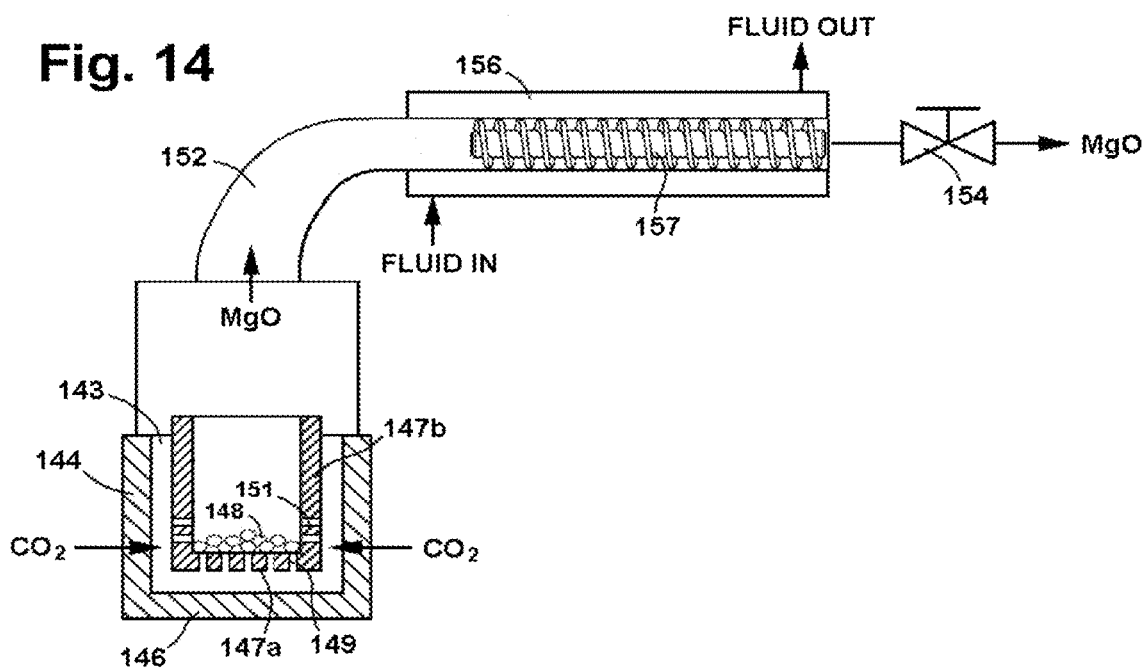
FIG. 14 is a vertical sectional view, partly schematic, of another embodiment of a reactor for use in carrying out the process of the invention.

The embodiment shown in FIG. 14 is generally similar to the embodiment of FIG. 12, and like reference numerals designate corresponding element in the two. In the embodiment of FIG. 13, hood 152 is fabricated of stainless steel and includes a cooling chamber 156 with a screw conveyor 157 for cooling the MgO and facilitating the recovery of MgO particles from the reactor. In the embodiment illustrated, fluid coolant is circulated through the cooler to cool the MgO passing through it. If desired, additional cooling can be provided by using an internally cooled feed screw in the conveyor.

Figure 15:
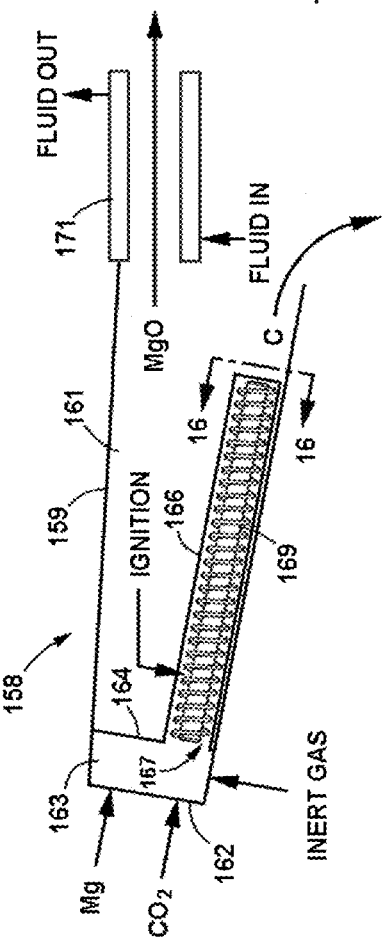
FIG. 15 is a vertical sectional view, partly schematic, of another embodiment of a reactor for use in carrying out the process of the invention.

FIG. 15 illustrates a continuous flow embodiment utilizing a horizontally extending reactor 158 having a conical side wall 159, with the axis of the reaction chamber 161 being inclined downwardly at an angle on the order of 10 degrees relative to the horizontal. The reactor has an end wall 162 at the small end of the cone and is open at the large end. An input manifold or chamber 163 is formed between the end wall and a baffle plate 164. This plate is spaced inwardly from and generally parallel to the end wall and is peripherally attached to the conical side wall. The reactor walls and the baffle plate are all made of graphite.

A generally U-shaped trough 166 extends in a downwardly inclined matter between the baffle plate and the open or outer end of the reaction chamber on the inner side of the lower portion of side wall 159. An opening 167 in the baffle plate at the upper or inner end of the trough provides communication between the input manifold and the reaction chamber.

Magnesium particles and $CO_2$ gas are introduced into the input manifold where they mix together before flowing through the opening in the baffle plate to the upper portion of the trough. Means such as a gas flame or an electric arc is provided for initiating ignition of the $CO_2$ and magnesium in the upper portion of the trough, and an inert gas such as argon is introduced into the intake manifold to prevent backflow from the reaction chamber to the manifold.

A feed screw or auger 169 extends longitudinally within the trough for carrying solid reaction products to the outer end of the reaction chamber. The lower or outer end portion of the feed screw is internally cooled to provide cooling for the carbon and other solid reaction products before they are discharged at the lower end of the trough.

A significant portion of the magnesium oxide (MgO) gas and nanomaterial produced by the Mg—$CO_2$ reaction beneficially rises to the top of the reaction chamber and passes through a cooling chamber 171 at the outer end of the upper portion of side wall 159 before being collected.

The system is maintained in an inert atmosphere to prevent post reaction combustion of the carbon and other reaction products.

Another embodiment is a small to medium scale, self-contained, continuous flow system, referred to herein as the modular embodiment. The primary features of this embodiment include capture of $CO_2$ directly from emissions, reduction of the $CO_2$ to carbon, production of reusable nanomaterials, and destruction, by heat of reaction, of harmful fossil fuel combustion products such as soot. The resultant nano-carbon, MgO, and other materials can be captured in a holding tank and separated in batch mode on a regular basis. The modular embodiment can, for example, be utilized in the production of graphenes or other nanomaterials for industrial purposes, and it may also be useful as a stationary emissions control system on a ship or in conjunction with a stationary diesel generator. A smaller version may be useful in mobile vehicular applications.

Subprocesses

A number of subprocesses are included in the preferred embodiments in order to provide a complete system and process for the production of nanomaterials. These subprocesses include management of reaction input materials and ignition systems, reaction process controls, reaction product separation and purification treatment, integrated product functionalization, recycling of product materials, and energy management. These processes are an important part of the invention, enabling it to operate as an industrial system.

Materials Management

There are two primary inputs or feedstocks for the preferred reaction—$CO_2$ and magnesium. In the preferred embodiment, pure (99+%) or relatively pure (commercial grade) gaseous $CO_2$ is utilized. If the $CO_2$ gas contains or is seeded with other gases, these gases will, subject to their inherent phase attributes, become an additional reaction product with the MgO and graphenes. The $CO_2$ feedstock can be obtained in large volumes from fossil fuel emissions, industrial sources such as breweries and refineries, natural earth deposits and other sources. In the preferred embodiments, the pressure of the $CO_2$ can be controlled to influence the performance of the reaction and the morphologies of the products, with $CO_2$ at a pressure in the range on the order of 200 to 800 psi being preferred. The gaseous $CO_2$ is injected into the reactor at a pressure determined to optimize the reaction performance and desired products.

Magnesium can be obtained from third parties in various alloyed forms or in very pure form. In the preferred embodiments, pure (99+%) magnesium feedstock is utilized, and it is introduced in the form of small particles. The size of the particles has been found to have a significant impact on the reaction and reaction products, and it is generally selected to achieve optimal reaction combustion and reaction products. The magnesium can, for example, be obtained in the form of bar stock and machined to the desired particle size. Thin gauge magnesium wire segments can also be used, if desired.

As discussed above, in the invention, a significant portion of the magnesium feedstock is obtained by recycling the very pure MgO product of the reaction in a low-cost electrolytic process. This method of obtaining magnesium has several advantages, the first being that the cost of recycled magnesium will be much lower than the cost of magnesium manufactured by third parties. A second advantage is that world magnesium production is relatively inelastic and, thus, magnesium could become more expensive should operators of the invention require significant amounts of fresh magnesium feedstock. Presently, over 80% of the world's magnesium supply is produced in China, which subsidizes the industry. Thus, the cost of magnesium may be artificially low, making recycling even more attractive. A third advantage of recycling is the high purity (over 99%) of the recycled magnesium, which is important to the Mg—$CO_2$ reaction.

If desired, other oxidizing and/or reducing agents can be utilized in place of or in addition to $CO_2$ and magnesium to produce other reaction products. The initial reactant for producing graphenes can be any carbon containing molecule such as carbon dioxide, carbon monoxide, phosgene ($COCl_2$), methane, ethylene, acetylene, other carbon containing material, and combinations thereof. The reducing agent can be another earth metal such as aluminum, titanium, zinc, sodium, lithium, calcium, and combinations thereof.

Ignition

High heat input is required for ignition of the Mg—$CO_2$ reaction. To maintain purity of the reaction products, it is preferable that an ignition source not introduce foreign contaminants into the reaction chamber. The Mg—$CO_2$ mixture can, for example, be ignited with an electric arc, an electric spark, a hydrogen-oxygen flame or a xenon lamp. An electric arc ignition with carbon electrodes is preferred due to its ease of operation, ability to function continuously, ability to function in high temperature environments, and because it does not introduce foreign material or gas to the reaction. Other ignition sources may also be used as long as they impart no impurities into the reaction product.

Process Controls

Significant control of the reaction and reaction products is also provided by manipulation of parameters such as regulation of the temperature gradient, the contact and saturation of $CO_2$, and the nature and flow of the magnesium particles. In the preferred embodiments, a number of process controls are implemented to optimize costs, safety, conservation of energy and materials, and production of desired products. These controls include, but are not limited to, varying the attributes of or type of input materials and gases, controlling the heat of reaction, controlling speed of reaction, controlling the post-reaction temperature gradient, controlling pressure within the reaction chamber, controlling the atmosphere into which the reaction product emerges to prevent combustion of the carbon, capturing the energy released by the reaction, and controlling the post reaction product separation and treatment processes.

In the preferred embodiments, the feedstock is managed before introduction to the reactor, and provisions are made in the reactor design for the introduction of additional materials and gases. The supply, purity and pressure of $CO_2$ feedstock are managed, as are the supply, purity and form of magnesium feedstock, with the size of the magnesium particles, and hence the volume to surface area ratio of the magnesium, directly impacting the production of and morphology of the reaction products. It has also been found that the amount of $CO_2$ available to the reaction has a significant impact on the reaction products, and the $CO_2$ can be introduced at precisely controlled pressures and rates to control the reaction process and products. A non-oxygen, $CO_2$, or inert gas environment is maintained post reaction and prior to heat dissipation to prevent combustion of the carbon graphenes. Solid particles of $CO_2$ may also be input into the reactor, depending on requirements, and will sublimate to large volumes of gas at high pressures. In this manner, $CO_2$ can either be flooded at high pressure in the reactor, or it can be introduced in restrictive quantities which allow the operator to 'throttle' the reaction with the Mg or Mg alloy or additional mixtures of input materials.

The reaction and reaction products can also be controlled by varying the pressure and presence of the gaseous and solid material inputs. Reactors in which the invention is carried out are designed to accommodate the regulated introduction of a range of gaseous and solid material inputs other than the feedstock at all three stages of the reaction, i.e. pre-reaction, during the reaction, and post-reaction. Other reactive gases or inert gases, such as argon, can be introduced to further control and optimize the reaction process and products. Other reactive materials such as aluminum, catalysts such as platinum, or non-reactive materials such as silver or silicon can be introduced either with the feedstock or directly into the reaction or at a point after the reaction. Also, the addition of non-reactant material with desirable attributes such as silver or silicon can result in the formation of a composite or decorated graphene material with potentially advantageous characteristics.

It has also been found that controlling the temperature gradient to which the vaporized reaction product and any additional materials are exposed immediately following the reaction affects formation of the products and the resultant morphologies and characteristics of those products. This gradient can be controlled in several ways. The reactor can, for example, have an open configuration, or the reaction can be confined to a limited space within the reactor. The use of an expander and the presence of an inert or non-reactive gas between the reaction site and the product outlet can also affect the temperature gradient, with the expander facilitating the natural tendency of hot vapor from the reaction to expand, cool, and nucleate or form the reaction product. A liquid or gaseous cooling agent can also be utilized to further control the temperature gradient in the reaction process. The cooling agent can, for example be injected directly into the reaction chamber, the discharge region, or the expander, or it can be circulated in a cooling jacket surrounding portions of the reactor.

Materials Separation

In both continuous flow and batch reactions, an initial separation of reaction products occurs when gaseous MgO is vented beneficially away from the other reaction products and/or when an upwardly directed annular flow process provides initial gravity separation of magnesium oxide nanoparticles and carbon nanoparticles. The reaction products are then further separated and purified in a post reaction separation process which is optimized for the production of the desired products.

In the preferred embodiments, the post reaction materials separation process consists of a substantially automated sequence of treatment, separation and purification steps which are applied to the unseparated post reaction product that emerges or is withdrawn from the reactor. In the production of graphenes and nano MgO, for example, the heterogeneous reaction product undergoes repeated cycles of treatment with deionized water, hydrochloric acid, and ultrasound, filtration to isolate graphenes, graphene drying, and heat treatment of the graphenes. This cycle is repeated as many times as needed to achieve the desired purity of graphenes.

Fluids are useful in separating materials that are resistant to dissolution and have different specific gravities, and are required in ultrasonic processing. In gravity separation and flotation, the density of the solution within the cell is manipulated to a specific value whereby the particles sink or float to occupy distinct layers within the vessel. The fluid can be water or other substances such as acids or fluids with other densities, depending on the solubility and reactivity of the materials to be separated.

Magnesium Recycling

The recycling of magnesium is an important part of the invention because of the cost and difficulty of obtaining magnesium of high enough purity for use in the Mg—$CO_2$ reaction, particularly in large scale operations. The crystalline nano MgO produced by the invention has been found to be extremely pure, and this unusually high purity makes recycling the MgO to Mg very practical and cost effective. Given the high cost of magnesium and MgO in the marketplace and the limited availability of pure, non-alloyed magnesium, the ability to recover and recycle highly pure magnesium is an important element and advantage of the invention.

Figure 17:
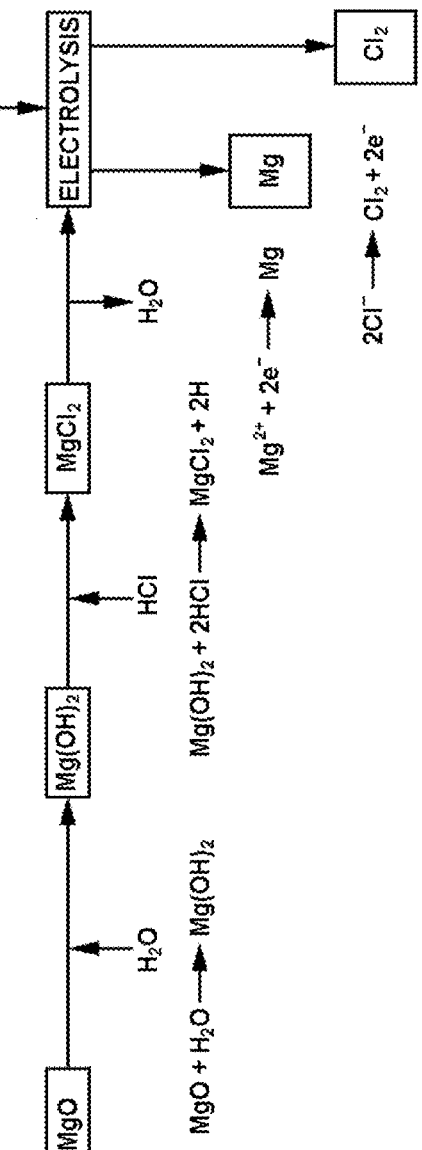
FIG. 17 is a flow chart showing the conversion of MgO to Mg by electrolytic reduction in one embodiment of the invention.

The preferred process for recycling magnesium in the invention is electrolytic reduction from $MgCl_2$. The chemical and electrolytic steps in the reduction of MgO to Mg by this process are shown in FIG. 17. As illustrated, the MgO reaction product is converted to $Mg(OH)_2$ by treatment with $H_2O$, and the $Mg(OH)_2$ is converted to $MgCl_2$ and $H_2O$ by treatment with HCl, with the differential thermal expansion between MgO and carbon opening up cracks in the carbon, allowing the HCl to attach to the carbon. In the electrolysis step, the $MgCl_2$ is separated into magnesium nanoparticles and chlorine gas.

Energy Management and Reuse.

The invention is designed to preserve, capture and utilize as much of the exothermic energy of reaction as possible. The reaction temperature of approximately 5610° F. (3098° C.) is unusually high and is in a range that can generally be achieved at larger scales only with solar furnaces or via nuclear reaction. In the preferred embodiments, waste heat from the reaction is captured and utilized in post reaction product separation and treatment, including production of electricity for use in the recycling of magnesium. Heat and light energy from the reaction can also be captured and utilized in other applications.

Thermodynamic Analysis

A thermodynamic analysis of the Mg—$CO_2$ reaction and the recycling of the MgO reaction product is summarized in Table 1 below.

TABLE 1

Production of Solid Carbon through Reduction Of Gaseous Carbon Dioxide with Magnesium

| Step | Reaction | Thermicity | Heat (MJ/kg) Mg | Heat (MJ/kg) C |
|---|---|---|---|---|
| A Production | Mg (s) + 0.5$CO_2$ (g) → 1MgO (s) + 0.5C (s) | Exothermic | −16.8 | −67.507 |
| B Mg Recycle | MgO (s) + $H_2O$ (l) → $Mg(OH)_2$ | Exothermic | −3.37 | −13.507 |
| C Mg Recycle | $Mg(OH)_2$ (s) + 2HCl (l) → $MgCl_2$ (s) + 2H2O (l) | Endothermic | 5.74 | 22.993 |
| D Mg Recycle | $MgCl_2$ (s) + Energy → Mg (s) + $Cl_2$ (g) | Endothermic | 22.4 | 89.667 |
| Total | | Endothermic | 7.91 | 31.647 |

As this table shows, one cycle of the process requires approximately 8 MJ of energy for each kilogram of magnesium produced and approximately 32 MJ for each kilogram of carbon. Each cycle generates 0.25 kg of carbon by reducing 0.92 kg of $CO_2$, and produces 1.45 kg of chlorine ($Cl_2$). On a molar basis, this can be expressed as:

$$Mg(s) + H_2O(l) \rightarrow Mg(OH)_2(s) + 0.5C(s) + Cl_2,$$

and on a mass basis as:

$$1 \text{ kg Mg}(s) + 0.92 \text{ kg } CO_2 + 0.75 H_2O(l) + 7.91 \text{ MJ} \rightarrow 0.25 \text{ kg } C(s) + 1.45 \text{ kg } Cl_2$$

The reactions were evaluated using a Gibbs free energy analysis that provides a theoretical maximum energy (heat) available for work in each step of the reactions. Steps A and B are exothermic, releasing approximately 20 MJ of heat per kilogram of magnesium while recycling Steps C and D are endothermic, requiring an energy input of approximately 28 MJ to proceed.

EXAMPLE 1

A reactor was constructed using two blocks of solid $CO_2$, more commonly known as dry ice. A cavity was drilled in one of the dry ice blocks to serve as a reactor vessel, and the other block was used as a cover. Magnesium bar stock was machined into chips which were placed in the cavity and ignited with a propane torch, following which the cover block was immediately placed on top of the first block. The reaction product, a mixture of white and black crusty powder, was collected and sent out for analytical testing. A second sample was prepared in a similar manner and treated with deionized water and hydrochloric acid (HCl) before being sent out for testing.

The test results showed that the reaction product consisted of nanomaterial and that the nanomaterial consisted of two dominant morphologies as well as some less frequently observed morphologies. The two dominant morphologies were a clear, irregularly shaped, flat particle showing classic evidence of graphitic (carbon) composition and a clear square, crystalline particle deduced to be MgO in nano-crystalline (periclase) form. The untreated reaction product showed considerably more nano MgO than the sample that had been treated with deionized water and HCl. The appearance of the carbon particles in each sample was substantially the same.

This example shows that the Mg—$CO_2$ reaction, and most likely the energy from the reaction, causes the feedstock to vaporize and reform by nucleation as nanometerial. The extreme temperature gradient between the reaction site or locus, where the temperature is approximately 5610° F. (3098° C.), and other locations within the reactor, where the temperature is near ambient, is believed to cause very rapid reformation of solid material from the vaporous reaction product. Moreover, the extremely short time lapse from formation of the vaporous reaction product to ejection of the vapor from the reaction site and interaction with the extreme temperature gradient surrounding the reaction site limits the operational timeframe for nucleation and results in the formation of very small, nanoscale particles. The reaction product vapor nucleates and self-assembles as homogeneous bonded carbon and MgO.

The process described in this example is believed to be not just a process for producing carbon and magnesium nanomaterials, but rather a more general process and enabling oxidation-reduction reaction for beneficial formation of nanomaterial in a vapor-nucleation process. The process has been found to be a repeatable process for production of nanomaterial including, but not limited to, the reaction products. Moreover, the absence of MgO in the reaction product that was treated with deionized water and HCl shows that the carbon nanoproduct can be effectively separated from the MgO nanoproduct by means of a relatively simple water and acid treatment.

When supplemental, low-pressure, gaseous $CO_2$ was injected into the cavity in the dry ice to enhance the reaction, there was a significant increase in the percentage of carbon produced relative to the percentage of MgO. Chemical analysis has shown the reaction products to be extremely consistent from batch to batch even when conditions are varied as discussed above and to consist of nanocarbon graphenes, nano MgO, and composites consisting of intercalated layers of graphene and MgO.

EXAMPLE 2

A reactor was constructed from blocks of solid $CO_2$, or dry ice, which were approximately 12 inches square and 1¾ inches square. A cavity having a diameter of approximately 1⅝" was drilled into one of the blocks to serve as the reactor chamber. Exhaust pressure release vents having a diameter on the order of ¼ inch were drilled laterally from the outer edges of the block to the cavity. The second block was used as a lid for the reactor.

Magnesium bar stock believed to have a purity of 99% was machined into several batches of various sized flakes. Approximately 10 grams of magnesium chips of between number 5 and number 10 sieve mesh (2.00-4.00 mm) were placed in the cavity. The flakes were ignited with an oxygen-hydrogen torch and the dry ice lid was immediately place on lower block. The reaction was observed to be extremely vigorous producing a sizable amount of light and resulting in some ejection of white smoky (MgO) material from the edges of the two blocks. The reaction took less than 30 seconds. A residue of agglomerated powdery black (C) and white (MgO) reaction product material was left in the reactor cavity. The reaction product material was removed by inverting the dry ice slab and dropping the reaction product into a clean container.

The reaction product was then processed to isolate the carbon material and provide samples for analysis. The material was separated using 4M (4 moles per liter) HCl, which caused the MgO to go into solution as $MgCl_2$. A black material (carbon) remained and was isolated and removed by washing the material through a 1 micron filter with alternating applications of ethanol and distilled water. The cleaned sample was spattered onto a plastic sheet, left to dry overnight, then placed in a clean container. A second sample was prepared in a similar manner.

During this study, it was observed that certain sized magnesium chips were more readily combustible than others and that the reaction product differed dramatically in appearance depending on the size of magnesium chips. Magnesium flakes having a sieve mesh size between number 5 (4 mm) and number 10 (2 mm) resulted in the most complete combustion. These particles were large enough to combust, yet small enough to allow a reasonable mass quantity in the reaction.

The samples were analyzed by a number of tests, including Transmission Electron Microscopy (TEM), Scanning Electron Microscopy (SEM), Glow Discharge Mass Spectrometry (GDMS) and X-Ray Diffraction (XRD).

The TEM and SEM analyses showed that particles from the samples set appeared to be agglomerated, plate-like particles of approximately 10 to 60 nanometer scale and had very large surface area. Graphitic carbon was identified in the samples by the presence of lattice fringes as well as electron diffraction (graphitic ribboning). This material appeared to be unique. Crystalline MgO (Periclase) having a particle size in the range of 40 to 60 nanometers was clearly observable, and the TEM imagery showed the presence of $MgAl_2O_4$ spinels in the form of 40 nanometer pill-like structures.

The GDMS analysis was performed to examine the purity of the samples. It showed that the sample material contained 15% magnesium by weight and, somewhat surprisingly, that it also contained 5.1% aluminum by weight. The aluminum was clearly present in the nanospinels and may have been in the samples in uncombusted form. The only potential source of aluminum was the magnesium bar stock that was thought to be pure.

The XRD test showed a strong presence of three types of crystalline structures, with spinels ($MgAl_2O_4$ nanocrystals) being the dominant form.

From this example, it was determined that the $Mg-CO_2$ reaction reliably produces nanomaterial of carbon and non-carbon types, and that essentially pure MgO is ejected by the reaction when vents are provided in the reaction vessel. It also demonstrated that the process will form nanomaterial from other reactive feedstock such as aluminum, and that the reaction and the vapor-nucleation cycle is likely to convert most, if not virtually all, materials present to nanomaterial form.

This example also demonstrated that the reaction can be controlled, e.g. by altering the magnesium feedstock to affect the efficiency of combustion and the composition of the reaction product. This strongly suggested that the morphology and characteristics of the reaction products are controllable.

It also confirmed that significant separation of the reaction products is feasible. The carbon reaction product was separated by means of simple deionized water, alcohol and acid washing, and these steps were found to be highly effective in reducing the presence of magnesium oxide in the carbon reaction product from its theoretical output ratio of approximately 85% MgO and 15% C to approximately 25% MgO and 75% C.

EXAMPLE 3

Magnesium barstock was machined into chips ranging in size between about 2.0 and 4.0 mm (sieve mesh sizes #5-#10). These chips combusted with $CO_2$ in a manner similar to that in Example 2, and two samples were prepared for separation processing.

As an initial step in the post reaction separation processing, the heterogeneous product samples were ground to a 140 mesh size to reduce agglomeration and provide more uniform samples with greater surface area for fluid treatment. The ground up samples were introduced into a vessel containing deionized water and were processed ultrasonically at 20 kHz and 500 Watts for a defined period of time to further reduce particle size and increase surface area. Thereafter, 12M (moles per liter) HCl was added to dissolve the MgO reaction product as well as any remaining uncombusted Mg. The HCl reacted with MgO and Mg to form $MgCl_2$ in an exothermic reaction. The vessel was allowed to cool, following which the sample was treated with HCl again and then once again treated ultrasonically for an identical period of time. Following the second ultrasound treatment, the sample was once again treated with deionized water. After these steps, the carbon product was removed by filtration (1 micron) as in Example 2. Two separate batches were prepared in this manner.

GDMS analysis of the samples showed a substantially lower magnesium content than in Example 2, with 12% by weight in the first sample and 11% in the second. It also revealed the presence of 5.5% aluminum by weight in the first sample and 3.1% in the second. The magnesium barstock used as the feedstock was then analyzed and found to contain 2.5% aluminum by weight.

TEM and SEM analysis showed that the two product samples were identical in physical form and that both samples contained graphitic carbon, which was identified by the presence of lattice fringes and electron diffraction consistent with graphitic material. The size of the carbon particles was predominantly on the order of 10 to 20 nanometers, substantially smaller than the particles produced in Example 2. These particles were also significantly less agglomerated than the particles in Example 2. The morphology of the nanocarbon was flat, with irregular edges, and the particles appeared to consist of one to several layers.

XRD analysis showed strong evidence of thin layers of graphitic graphene material in both samples, and both samples had two non-graphitic dominant phases: $MgAl_2O_4$ (spinel) and MgO (periclase). This analysis also suggested the presence of composited material in addition to the spinel and periclase structures. It also revealed the presence of traces of pyrolitic carbon, probably from the ignition source. The carbon material in the samples was determined to be is hydrophobic.

Porosity tests showed the carbon product sample material to be mesoporous (pores in the range of 1 to 50 nanometers), with a majority of the pores in the range of 1 to 20 nanometers. Surface area tests showed surface areas between 230 and 460 square meters per gram. It is believed that some pores may be blocked by the Mg—Al oxides (spinels) that were found in the samples.

These tests show that the invention produces one to a few layers of a nanocarbon material having a surface area, pore size, pore volume and order characteristics consistent with high quality graphenes. The product samples were consistent in appearance and test results from batch to batch.

The GDMS tests indicated that magnesium oxide remained present in the samples in significant quantities, and the XRD tests provided a strong indication that the magnesium oxide is present as crystalline nano-periclase. Analysis of the TEM images and other tests suggests that the remaining MgO is intercalated with the carbon graphene layers. This is consistent with the evidence of composite material indicated by the XRD tests. The MgO intercalated with graphene may be an important and novel material.

The presence of composites consisting of graphenes and MgO in the product samples suggests that the production of composites of graphene or MgO with other non-feedstock materials is also feasible.

EXAMPLE 4

Laboratory grade, 99.9% pure, magnesium bar stock was machined to the established chip size, and an airtight reaction chamber was constructed. Several samples were prepared and tested.

A first sample was prepared by reacting the 99.9% pure magnesium with $CO_2$ in an argon environment. The reaction product was separated and stored in an argon environment, with the separation process including HCl, deionized $H_2O$, and ultrasonic treatment as in Example 3.

A second sample was prepared in a similar manner by reacting the 99.9% pure magnesium with $CO_2$ in an argon environment, but then a reflux/leach process was used to separate the reaction product. The sample was refluxed with nitric acid by boiling the sample in the acid and re-condensing vapors in a confined environment. The sample was then extracted from the solution, cleaned with deionized water, and dried overnight in an oven.

A third sample was prepared by reacting 95% pure magnesium (similar to AZ31) with $CO_2$ in an argon environment. This sample was not processed for separation or tested, but instead was stored in an argon environment for reference purposes.

A sample of the unreacted laboratory grade (99.9% pure) magnesium feedstock was kept in an air environment for the purpose of verification of the purity of the magnesium input.

In addition, samples of ejected MgO were collected in a vacuum system attached to the reactor.

The samples were analyzed in a number of tests, including TEM and SEM, GDMS, XRD, pore size, pore volume, surface area, BET, gas sorption, and thermal and oxidation stability.

The GDMS analysis showed that sample separated by HCl, deionized $H_2O$, and ultrasonic processing contained 20% magnesium by weight, whereas the sample separated by the nitric acid reflux/leach process contained 40% magnesium by weight. It also confirmed the high purity (99.9%) of the magnesium reactant and determined that the MgO sample was of unusually high purity (above 99%), with none of the contaminants commonly found in MgO samples.

The XRD tests showed that the sample separated by HCl, deionized $H_2O$, and ultrasonic processing had only two phases, a dominant crystalline MgO phase and a crystalline carbon phase consistent with graphenes.

The TEM images were very similar to the ones in Examples 3 and 4. As can be seen in the TEM image in FIG. 18, the product contains single layer graphenes as well as graphenes having several layers. These are the clear, irregular bodies having a length of approximately 20 nanometers. Substantially cubic MgO crystals (periclase) of approximately 40 to 60 nanometers are also visible in this image. These are darker, indicating denser or layered material. The image in FIG. 19 shows a single MgO crystal with clear definition of graphene layers.

Figure 20:
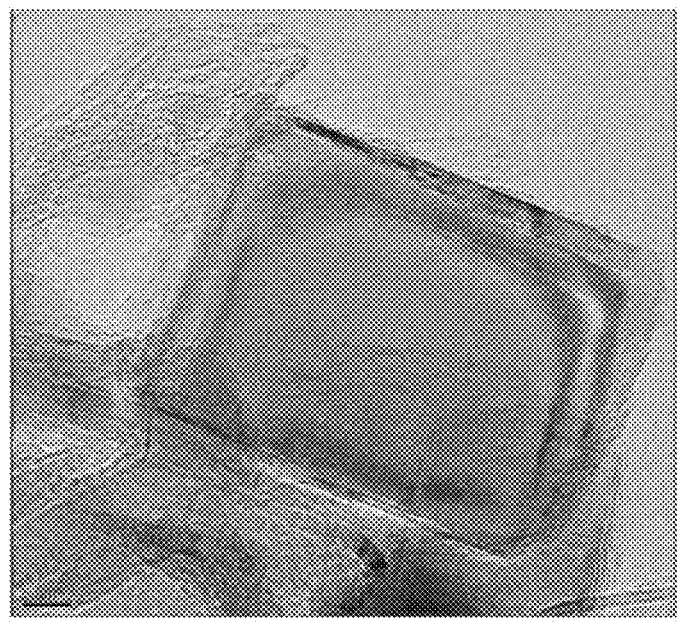
FIG. 20 is a TEM image of graphene-MgO crystal with layers produced in accordance with the invention.
Figure 21:
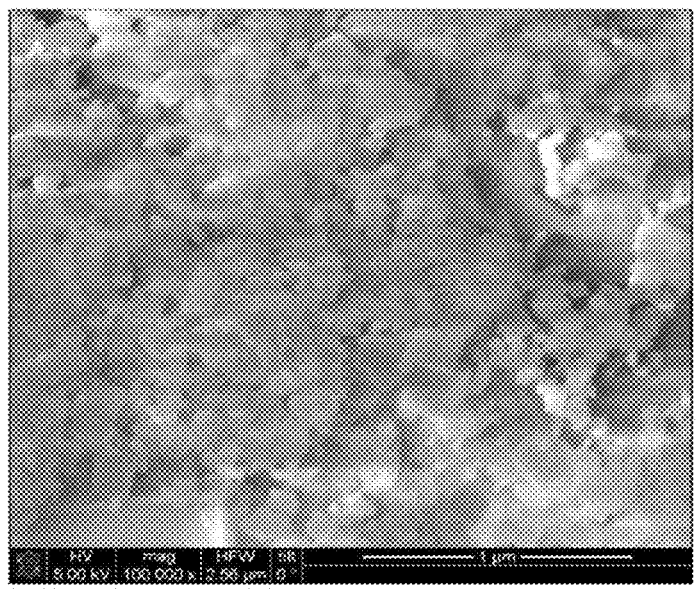
FIG. 21 is a scanning electron microscopy (SEM) image of magnesium oxide (periclase) cubic nanocrystals produced by the process of the invention.

The SEM images were also similar to the ones in Example 3 in showing agglomerated material. A 500 micrometer scale image of the sample material is shown in FIG. 20. In these images, the graphene platelets were observed to have short-range order and to be in the range of 10 to 20 nanometers. The graphene-MgO composite material was observed to have both short- and long-range order, to have 6 or more layers, and to be consistently in the range of 40 to 60 nanometers. Cubic crystals of MgO produced by the invention can be seen in the SEM image of FIG. 21.

In the gas sorption tests, the sample separated by HCl, deionized $H_2O$, and ultrasonic processing was found to have both a significantly larger surface area and significantly more pore volume than the sample separated by the nitric acid reflux/leach process.

In the thermal testing, no melting point of the product was found in the temperature range tested, and very high thermal transference was indicated.

The pore testing showed that the majority of the pores have size of 5 nanometers, similar to that of the product samples in Example 3. They also showed that they were mesoporous, with pores in the range of 2 to 50 nanometers.

The results of the surface area, pore volume, pore size test are summarized in the table below.

TABLE 2

| SURFACE AREA DATA | |
|---|---|
| Multipoint BET | 2.048E+01 m$^2$/g |
| BJH Method Cumulative Adsorption Surface Area | 5.659E+01 m$^2$/g |
| DH Method Cumulative Adsorption Surface Area | 5.786E+01 m$^2$/g |
| DR Method Micro Pore Area | 2.441E+01 m$^2$/g |
| PORE VOLUME DATA | |
| BJH Method Cumulative Adsorption Pore Volume | 5.141E−02 cc/g |
| BJH Interpolated Cumulative Adsorption Pore Volume for pores in the range of 5000.0 to 0.0 Å Diameter | 5.141E−02 cc/g |
| DH Method Cumulative Adsorption Pore Volume | 5.024E−02 cc/g |
| DR Method Micro Pore Volume | 8.695E−03 cc/g |
| PORE SIZE DATA | |
| BJH Method Adsorption Pore Diameter (Mode) | 7.005E+00 Å |
| DH Method Adsorption Pore Diameter (Mode) | 7.005E+00 Å |
| DR Method Micro Pore Width | 2.151E+01 Å |

The MgO sample was reacted and functionalized with deionized water to form magnesium hydroxide ($Mg(OH)_2$), a so-called green plastics fire retardant well known to those skilled in the art. The $Mg(OH)_2$ functions as a fire retardant by converting back to MgO and $H_2O$ when exposed to temperatures in excess of 332° C., at which temperature it undergoes an endothermic decomposition. The formation and decomposition of the functionalized MgO was verified in a series of successful tests.

This testing confirms that the invention consistently produces graphenes and indicates that graphene is the dominant nanostructure in the product samples. The thermal test results show very high thermal transference consistent with graphenes, and comparative analysis with available TEM graphene images shows that the carbon nanostructures are graphenes. Moreover, TEM images from Examples 2-4 showing both lattice fringes and electron diffraction indicate that the process of the invention produces graphenes and is extremely consistent over time.

The graphene-MgO composites produced by the invention are believed to be novel, with the graphenes encapsulating the MgO in such a way that the composite is inert to acid treatments.

The presence of novel nano-structures, composites, spinels, periclases and graphenes in the reaction product indicates that that the invention can produce novel materials and composites, depending on feedstock.

This testing also confirms that the invention is controllable such that the products can be determined, separated and purified, and the morphologies and attributes of the products can be controlled. The combination of XRD and GDMS data indicates that, when the inputs are pure Mg and $CO_2$, the reaction produces a pure material consisting of MgO and carbon and that all other components were insubstantial. Varying the separation protocol has been found to have a significant influence on the purity and character of the product materials. The use of HCl and ultrasonification proved to be superior to the use of a nitric acid reflux/leach process for separation of magnesium products from the sample batch. The absence of aluminum in the product samples produced from 99.9% pure magnesium confirms that different nanoscale materials can be produced with different feedstock.

Figure 16:
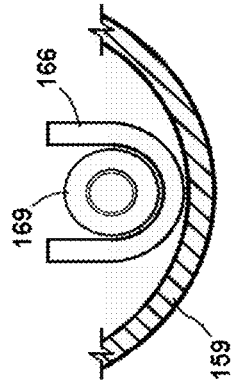
FIG. 16 is a cross-sectional view taken along line 16-16 in FIG. 15.
Figure 18:
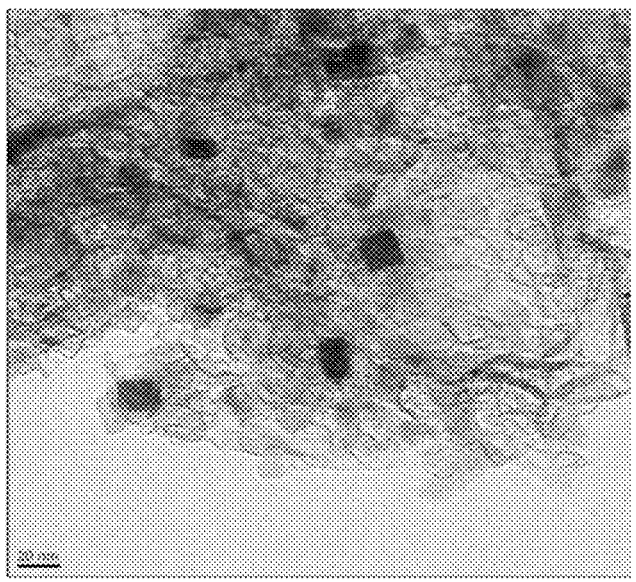
FIG. 18 is a transmission electron microscopy (TEM) bright field image of a material having graphene platelets and graphene-MgO composites produced in accordance with the invention.
Figure 19:
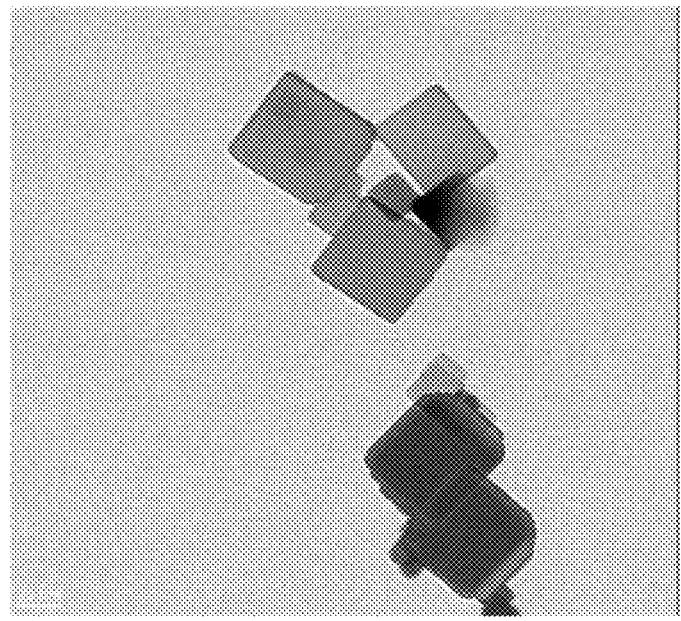
FIG. 19 is a TEM image of cubic and hexagonal crystals of magnesium oxide (periclase) of approximate 40 nano-meter scale produced by the process of the invention.

The TEM image of FIG. 18 shows the broad range of capabilities of the invention. It shows graphenes on the right, a graphene-MgO crystal composite in the center, and amorphous carbon on the right. The amorphous carbon may have been formed because local conditions in the reactor did not produce adequate reaction heat to fully vaporize the carbon and produce graphenes. Thus, FIG. 16 illustrates. Note that this image of amorphous carbon is the only image of amorphous material obtained in the three phases of testing to date.

Both the sample prepared by HCl and ultrasonic separation and the sample prepared by the nitric acid reflux/leaching had a larger surface area and more pore volume than the samples in Examples 2 and 3, possibly due to the elimination of spinel structures that may have clogged the pore space of the material. This finding is further indication that the reaction process can be manipulated to produce nanomaterials having significantly different characteristics.

The argon environment in the reactor and storing the product samples in argon had no discernable impact on either the reaction process or the reaction products of using inert gas to isolate the reaction was detected.

EXAMPLE 5

Two samples were prepared from gaseous $CO_2$ in a carbon steel reaction vessel. The first was prepared in a high pressure, pure $CO_2$ environment, and the second was prepared in a pure $CO_2$ environment at standard atmospheric pressure. The carbon steel reaction vessel had ports for ignition, feedstock injection, and MgO ejection, and Ignition was provided by electric arc. Both samples were prepared from magnesium chips having a size on the order of 2.0-4.0 mm (#5-#10 sieve mesh). Post reaction separation was done with HCl and ultrasound, and the samples were dried to create a graphene powder.

Additional samples were prepared in a similar manner but with high pressure gaseous carbon monoxide (CO) in a carbon steel vessel.

The sample prepared from the gaseous $CO_2$ reaction at high pressure was examined with GDMS, TEM, SEM, and XRD testing. The GDMS testing showed that the percentage of magnesium in the sample was only 10% by weight, whereas the samples prepared with solid $CO_2$ in the previous examples contained 20%-25% Mg by weight.

The TEM and SEM images both revealed that the morphology of the materials produced in the reaction was similar to that produced from solid (dry ice) $CO_2$, and the XRD images revealed only one dominant phase—a carbon phase.

The material produced from gaseous $CO_2$ at atmospheric pressure was examined with GDMS and Instrumental Gas Analysis (IGA). The GDMS testing indicated that the mass percentage of magnesium in the samples was 14% by weight, and IGA testing found concentrations of the following elements by weight percent: nitrogen 0.64%, hydrogen 0.77%, and oxygen 8.6%. In comparison, samples prepared with solid $CO_2$ (dry ice) in the previous examples contained 11.7% oxygen after processing in fluid with no heat processing and only one processing cycle. TEM analysis showed the presence of graphene material substantially similar in character and appearance to that shown in the TEM results in Example 4 and the prior examples.

In preparing the samples with CO, it was found that ignition of the reaction with high pressure CO was extremely difficult and, when successful, resulted in only partial combustion of the magnesium.

Gaseous $CO_2$ was found to be highly effective as a feedstock in the Mg—$CO_2$ reaction. Virtually all MgO remaining in the samples was intercalated MgO encapsulated in graphenes that are recalcitrant to HCl and ultrasonic purification treatment, and gaseous $CO_2$ was found to produce significantly less recalcitrant intercalated MgO than solid $CO_2$ feedstock. The Mg in reaction product is predominately in the form of MgO. The MgO weight of the sample prepared with high pressure $CO_2$ gas was approximately 14% versus approximately 35% for the samples prepared with dry ice in the earlier examples.

Gaseous $CO_2$ at higher pressure also results in significantly lower recalcitrant intercalated MgO-C composites in the reaction product than products prepared with gaseous $CO_2$ at atmospheric pressure. The MgO weight in the high pressure sample was approximately 14% compared with approximately 20% in the sample prepared at atmospheric pressure.

Highly pure MgO was ejected very vigorously from the reaction chamber, whereas virtually all the graphenes remained within the chamber. The degree of such separation can be controlled in a number of ways, including the use of vents and vacuum to recover the MgO and varying the initial phase and pressure of the $CO_2$ input.

Carbon monoxide (CO) has been found to be considerably more difficult to react with magnesium and may not be an attractive alternative to $CO_2$ in the reaction. The difficulty in reacting is believed to be due to the lesser amount of oxygen in CO than in $CO_2$ at similar pressures. CO is, however, believed to be very likely to be very effective in modulating the vigor of the Mg—$CO_2$ reaction.

The invention has been found to be extremely consistent in producing reaction nanoproduct when the $CO_2$ feedstock is changed from solid $CO_2$ (dry ice) to gaseous $CO_2$, both at atmospheric pressure and at high pressure. The amount of intercalated MgO-graphene composites has been found to be highly controllable by adjustment of the $CO_2$ feedstock, with gaseous $CO_2$ at high pressure producing the least intercalated material and solid $CO_2$ (dry ice) producing more than 100% more by weight.

It is believed that two operational parameters are responsible for the reduction in the amount of intercalated MgO-graphene composites. First, the saturation of $CO_2$ at the reaction site is the highest with high pressure gaseous $CO_2$ and the lowest with solid $CO_2$ (dry ice), which suggests that $CO_2$ saturation is a critical factor in controlling the degree of formation of intercalated material. Second, the open space surrounding the magnesium in the carbon steel vessels is approximately ten times the open space in the dry ice blocks. The additional space provides the vaporous reaction product substantially more opportunity to nucleate and form homogenous carbon and MgO nanoparticles. Thus, it is believed that a continuous flow system in which the reaction products are ejected from the reaction site and have the maximum opportunity to nucleate and form homogenous carbon and magnesium oxide nanoparticles will result in a very low amount of intercalated MgO-graphene composites.

EXAMPLE 6

Samples were prepared in the airtight reaction chamber of Example 4, with a $CO_2$ flood being used instead of argon to prevent post-reaction carbon combustion. A partial vacuum and collection receptacle was attached to the reaction chamber for collecting vented MgO, and solid $CO_2$ (dry ice) was used as the feedstock in order to provide the maximum amount of intercalated MgO-graphene composite for testing purposes.

A first sample underwent standard fluid and ultrasound processing followed by heat treatment at 1200° C. for a period of 2 hours. This cycle was repeated twice. Heating was performed in a quartz tube at vacuum, with the material in an alumina boat. GDMS testing showed the following weight concentrations of elements in the sample:

| | |
|---|---|
| Mg | 6% |
| Al | 4% |
| Si | 7% |
| Ti | 0.1% | and IGA testing showed the presence of 6.2% oxygen. Thus, the heat treatment significantly reduced the mass quantity of both magnesium and oxygen in the product. The aluminum in the sample is believed to have come from the alumina boat that held the sample during the heating process.

A second sample was prepared in a similar manner except the material was placed in a seasoned quartz boat, the heating was done in a seasoned quartz tube at vacuum, and the heating cycle was repeated three times. GDMS testing showed this sample contained 3% magnesium and 5% silicon by weight, with negligible aluminum and titanium. IGA testing showed the presence of 3.6% oxygen. Thus, using a quartz boat instead of an alumina boat at high temperatures was found to eliminate the diffusion of aluminum into the sample, and it was concluded that the high temperature of the heating process caused silicon to diffuse from the quartz into the sample.

The next sample was also prepared in a similar manner, with fluid and ultrasonic processing followed by heating in a seasoned quartz boat in a seasoned quartz oven at vacuum at 1200° C. for a period of 2 hours. This complete cycle was repeated three times, then the sample was heated at 1000° C. for a period of 2 hours. GDMS testing showed that the sample contained 2% magnesium and 6% silicon by weight, and IGA testing showed the presence of 3.4% oxygen and 0.57% nitrogen. TEM images showed that the morphology of the graphene material produced in the process was similar to that of material produced without heat treatment, although no nano MgO or MgO-graphene composites were observed. SEM images showed that the morphology of the materials produced in the process was similar to that of materials produced without heat treatment, and XRD images showed the presence of only one dominant phase—a carbon phase. These tests seem to confirm that the silicon material was infused from the quartz boat and possibly also the quartz vacuum apparatus, and it was concluded that 1200° C. is an upper boundary for the heating if a silicon-free material is desired.

Another sample was then prepared in a similar manner, with heating in a seasoned quartz boat in a seasoned quartz tube at vacuum at 1000° C. for a period of 4 hours. This cycle was repeated four times. GDMS testing showed that this sample contained 8.5% magnesium and 0.15% silicon by weight, and IGA testing showed the presence of 4.6% oxygen. Thus, lowering the heating temperature from 1200° C. to 1000° C. significantly reduced and essentially eliminated the mass quantity of silicon that diffused into the sample, notwithstanding the doubling of the heating time for all heat cycles. However, the lower heating temperature was considerably less effective in removing oxygen from the sample even with the increased heating time. Therefore, it was concluded that 1000° C. is a lower boundary for the heating process.

The next sample was prepared in a similar manner, with heating in a seasoned quartz boat in a seasoned quartz tube at vacuum at 1000° C. for a period of 4 hours. This cycle was repeated four times. The sample was then heated at 1150° C. for a period of 2 hours, followed by with heating at 1125° C. for a period of 2 hours. GDMS testing showed that this sample contained 5% magnesium and 0.1% silicon by weight, and IGA testing showed the presence of 4.6% oxygen by weight. Thus, with the additional heating cycle, the quantity of both magnesium and oxygen was reduced, and the quantity of silicon remained substantially the same.

Another sample was prepared in a similar manner, with a first heating cycle of 2 hours at 1125° C. followed by four successive cycles of heating at 1150° C. for 2 hours. The heating was done in a seasoned quartz tube at vacuum, with the material in a seasoned quartz boat. GDMS testing showed that this sample contained 3.5% magnesium and 0.3% silicon by weight, and IGA testing showed the presence of 2.2% oxygen.

A final sample was prepared using five heating cycles at 1150° C. for 2 hours each. The heating was done in a seasoned quartz tube at vacuum, with the material in a seasoned quartz boat. GDMS testing showed that this sample contained 3.2% magnesium by weight and negligible silicon, and IGA testing showed the presence of 2.1% oxygen. From this, it was concluded that 1150° C. is an optimal temperature both for reduction of the mass concentration of oxygen and Mg in the sample and for preventing diffusion of silicon into the graphene sample from quartz equipment.

Although an Ellington diagram showing the relationship between temperature and standard free energies in the formation of oxides suggests a somewhat higher temperature (1850° C.), by doing the heat processing under vacuum and for a longer period of time, the inventors have avoided the need for the higher temperature. However, the higher temperature can be utilized, if desired, with corresponding adjustments in pressure and/or processing time, and since reaction rates for many reactions double with each 10° C. rise in temperature, higher temperatures can have a dramatic effect on the reactions.

Graphene Production

In one presently preferred embodiment of a batch process for producing graphenes which roughly parallels the embodiment of FIG. 2, the Mg—$CO_2$ reaction is carried out in graphite crucibles placed in a steel vessel. The steel vessel has an internal $CO_2$ atmosphere around the graphite crucible to prevent combustion of the graphite and contamination by other gases such as air. The $CO_2$ is introduced into the vessel at low pressure and enters the graphite crucible through openings in the bottom, top and sides of the crucible. Magnesium metal chips are placed in the crucible and ignited by an electric arc (40VAC, 90A).

The system can have a negative pressure MgO collection system with a 1 micron filter attached to the top of the steel vessel, or the MgO can be collected in a low pressure, cooled cylindrical axial collector that has an auger system to constantly remove the MgO powder that is produced when the MgO gas nucleates inside the MgO collector. The MgO is collected at the exit of the collector and stored for recycling back into Mg metal or for use in other applications.

The combustion products formed in the graphite crucibles are ground to a 140 mesh size (0.104×0.104 mm) to make the material easier to process in subsequent fluid purification processing steps.

The ground material is ultrasonically processed in deionized water. The processing time is dependent on the level of the ultrasonic energy input, with lower energy requiring longer processing times and higher energy requiring shorter processing times. The processing can be done, for example, in 2 hour cycles in a 500 watt ultrasonic unit. Since energy is the product of time and power, either time or power can be adjusted as needed. For industrial scale production, large ultrasonic processors will be utilized.

Hydrochloric acid (HCL) having a density of 20° Baumé is added to the material from the ultrasonic processor to dissolve any free Mg metal and MgO present in the solution, and this new solution is also processed ultrasonically for a suitable time at a suitable energy level, e.g. 2 hours at 500 watts.

The solution is then filtered in a Büchner vacuum funnel 26 with 2.5 micron filter paper, with the graphenes being deposited onto the filter paper and the $MgCl_2$ passing through. The filter paper and graphenes are then heated, in a low temperature oven (less than 100° C.) to dry the graphenes and facilitate their removal from the filter paper.

The dried material is placed in a seasoned quartz boat in a high temperature seasoned quartz oven and heated to 1150° C. for a preset period of time which can range from less than 2 hours to more than 6 hours, depending upon the result desired. The oven is regulated by a PID controller that provides a low temperature ramp up, operation at the processing temperature for the preset period of time, and then a ramp down in temperature. The low temperature ramp up stabilizes the combusted material and drives off any water that may be present in it in order to avoid any loss of material due to violent evaporation of water in the material and eruption of the material out of the boat by the water evaporation energy.

The material is removed from the oven, and a GDMS analysis is made to determine whether additional processing is required to achieve the desired level of purity. If so, some or all of the steps in the process can be repeated until the desired purity is achieved.

This process has been found to be fully reproducible and quite robust in that unintended or unplanned events in the procedure had no effect on the final graphene product. For example, prior to the use of the PID controllers, the heating cycles were not exact and varied by as much as +/−30 minutes, and the thermocouples for the temperature controllers were not certified by a standards laboratory. The procedure is very forgiving.

If desired, other techniques can be employed to purify the material before the treatment with acid and ultrasound. Ore beneficiation using density separation is effective since there is a significant difference in density between Mg and MgO. Separation can likewise be done by centrifugal action in a cyclone type of separator.

Ignition Systems

The $Mg$—$CO_2$ reaction must be ignited by an external source of heat, preferably one that avoids contamination of the graphene reaction product. Many ignition systems have been tested. An $H_2/O_2$ torch, for example, has been found to be effective in an open cavity in a sheet of solid $CO_2$ (dry ice), and an $H_2/O_2$ torch ignited by an electric spark (15,000 volts) has been found to be effective in a gaseous $CO_2$ vessel operating in the batch mode. When the reaction is conducted with $CO_2$ at atmospheric pressure, it was found to be preferable to use an AC or DC electric arc, with a ground connection to the graphite crucible and the arc being struck with a magnesium rod or carbon electrode in very close proximity to the magnesium chips. With the electrode and the ground in a Siamese parallel configuration and the two simultaneously coming very close to, but not touching the magnesium chips, the system has the potential to ignite the $Mg/CO_2$ mixture in an aerosol environment.

If desired, a high intensity lamp, a glow plug, or an $H_2/O_2$ torch can be used in place of the electric arc to ignite the $Mg/CO_2$ mixture. However, an electric arc can be left on continuously to insure continuous combustion of the $Mg/CO_2$ mixture, and multiple carbon arc units can also be used to insure complete and total combustion of the Mg/mixture.

Reactor Design

Different materials have been tested for use in the construction of a reactor for carrying out the invention. A carbon steel reactor performed well initially but degraded from repeated exposure to high temperature. The reactor shown in FIG. 8, with a pocket of high temperature zirconia oxide ($ZrO_2$) in the base, worked well thermally, but contaminated the reaction products with $ZrO_2$. A graphite reactor with a graphite crucible performed very well over extended testing, and graphite is currently the preferred material for reaction containment. Graphite has good high temperature properties, and any contamination carbon from the graphite will just go into the graphenes. Also, graphite is readily machined to desired shape and dimensions.

Heat Cycle Containment

Heating the carbon reaction products to the temperatures employed in the separation and purification stages requires that the samples be treated under vacuum to prevent combustion of the carbon, and it also requires that the oven be made of materials that are capable of maintaining their structure over repeated exposure to the processing temperatures without contaminating the products being treated. Quartz tubes and mullite or porcelainite tubes ($3Al_2O_3 2SiO_2$ or $2Al_2O_3 SiO_2$) have been used successfully for this purpose. Other materials, such as titanium, have been found to fail structurally and to contaminate the product.

Observations and Conclusions

The invention produces materials that are remarkably consistent over time and with different embodiments. TEM and XRD results demonstrate consistent production of graphenes of a highly crystalline nature. Pore size and volume measurements also remain consistent, with graphenes from which MgO-graphene composites are removed having significantly higher surface area than graphenes from which the composites are not removed.

The reaction products can be controlled and managed at various stages of the process. The addition of heat treatment to the fluid and ultrasound steps results in a substantial reduction of recalcitrant intercalated MgO-graphene composites due to the release of oxygen from the MgO bond or by sublimation of the MgO in the graphene composite. The temperature and duration of the heat treatment can be determined empirically, or it can be calculated through the use of Ellinghams Diagram. The reduction of MgO-graphene composites takes place in a linear manner where each heat cycle reduces the remaining composites by a constant percentage, and it is believed that the reaction product graphenes can be purified commercially to a purity level of 99% or higher. In order to have the least amount of intercalated MgO-graphene composites to start with, it is preferable to use gaseous $CO_2$ feedstock, even more preferably pressurized gaseous $CO_2$ feedstock, rather than solid $CO_2$ (dry ice) feedstock.

The examples show that the beneficial vapor-nucleation cycle and the beneficial exothermic oxidation-reduction reaction of $CO_2$ and Mg are parts of a broader, more general process that can produce nanomaterials other than graphenes and other carbon nanoproducts. The process creates a vaporized homogeneous material that "self-reorganizes" as pure materials to a significant degree.

Highly pure MgO reaction product is beneficially ejected from the reaction site, e.g. through vents in the reaction chamber and can, for example, be collected in a vacuum particle collector. The MgO ejection can also be utilized as a preliminary step in separating the reaction products.

Batch processing of magnesium metal and solid $CO_2$ (dry ice) in the production of graphenes results in a product with a relatively high initial concentration of MgO, which is believed to be the result of incomplete combustion due to insufficient $CO_2$ to combine with the magnesium. When gaseous $CO_2$ is added to the reaction, there is a significant decrease in the amount of MgO in the product, thus demonstrating that the composition of the reaction product can be controlled by controlling the amount of $CO_2$ available to the reaction.

Although the Mg—$CO_2$ reaction is the preferred method of generating the high temperatures required in the production of graphenes and other nanoproducts, it is possible to use other materials in the reaction, if desired. Thus, for example, aluminum can be used instead of magnesium as a primary feedstock to make graphenes and/or graphene composites with different chemical and physical compositions. There are other elements that could also be considered for use as reactants in the process, and there likewise are other carbon compounds, such as $CH_4$ and other hydrocarbons that could be used instead of $CO_2$ to provide the carbon source for the reactions.

The purity and composition of the reaction feedstock can also affect the purity of the reaction products and the composition of the final product. Thus, for example, if the magnesium feedstock has even a small percentage of aluminum in it, the reaction will produce aluminum and spinel contamination in the graphene produce. Likewise, $CO_2$ purity will effect the final chemical composition of the reaction products. The high temperature reactions and use of various reactants, additives, or components may make it possible for many chemical applications to be done on a continuous industrial scale when heretofore they could only be done on that scale with a solar furnace.

By including other gases in the $CO_2$ mixture, the addition of other elements to the graphene can be easily accomplished. For example, the addition of borane ($BH_3$ or $B_2H_6$) to the $CO_2$ results in a p-doped graphene semiconductor when a semiconductor material is doped with the reaction product, and the addition of ammonia ($NH_3$) to the $CO_2$ results in an n-doped graphene semiconductor when a semiconductor material is doped with the reaction product. In view of the desirable electronic properties of graphene, p-doped and n-doped graphene semiconductors could have wide use and substantial value.

It should be noted that even though the measured reaction temperature of 5610° F. (3098° C.) is below the vapor point of MgO (6512° F./3600° C.), MgO nanoparticles are nevertheless formed by the reaction. The inventors believe this may be due to the temperature deep in the reaction zone being substantially higher than the temperature that is measured outside that zone.

It also appears that the reaction temperatures at which the nanomaterials are formed may range from about 1000° F. (537° C.) to about 7000° F. (3871° C.).

The nanomaterials produced by the invention have shown a strong tendency to form as separate homogeneous particles, with the MgO tending to beneficially vent and the carbon graphenes tending to remain in the reactor vessel.

The high temperature of the reaction may have industrial application beyond the production of graphenes, nano-periclase or composites thereof. For example, the energy and temperature of the reaction may be useful in alloying fine powders of metals such as aluminum, steel, or iron with magnesium and/or in infusing such metals with graphenes to produce products such as light weight, super strong graphene-steel, a magnetic or field weldable magnesium-iron alloy, or a new family of iron, aluminum, or steel materials.

The invention has a number of important features and advantages. It provides a process for the production of graphenes and other nanomaterials, utilizing a beneficial vapor-nucleation cycle enabled by the high energy and heat of a highly exothermic oxidation-reduction reaction of magnesium and carbon dioxide, together with integrated feedstock management, cooling of the reaction products, capture of heat from the reaction, recycling of energy and materials produced by the reaction, capture of reaction product, separation and purification of reactor product, and product functionalization.

The reaction produces extreme temperatures that cause an extraordinary breakdown of material bonds, most likely in a vapor state, followed by a rapid cooling of the vaporized material as it is forced away from the reaction. This results in the vapor contacting an extreme declining temperature gradient which causes the material to beneficially nucleate and coalesce into predominantly homogeneous nanomaterial forms.

If desired, other sources of very high temperature, including other oxidation-reduction reactions involving earth metals and oxygen bearing molecules, can be utilized instead of the reaction of magnesium and carbon dioxide to generate the conditions for the process to produce nanomaterials.

The invention produces nanomaterials from virtually any material present in the reaction and exposed to the high energy and temperature of the reaction, and beneficially produces nanocarbon and nano-MgO. In the preferred mode, these beneficially formed nanomaterials are predominantly in the form of homogeneous, nanoscale, crystalline forms of carbon known as graphenes and MgO known as periclase.

Figure 22A:
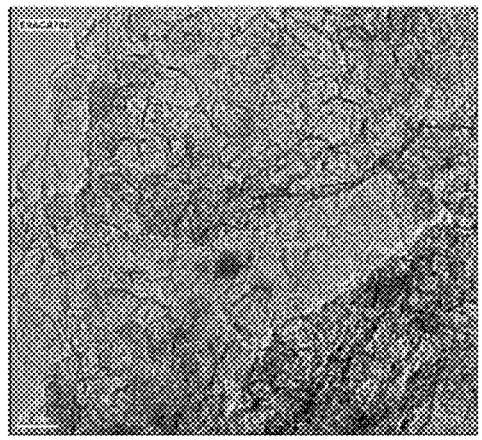
FIG. 22a is a TEM image of a graphene sample generated with solid $CO_2$ (dry ice) on a 10 nanometer scale.
Figure 22B:
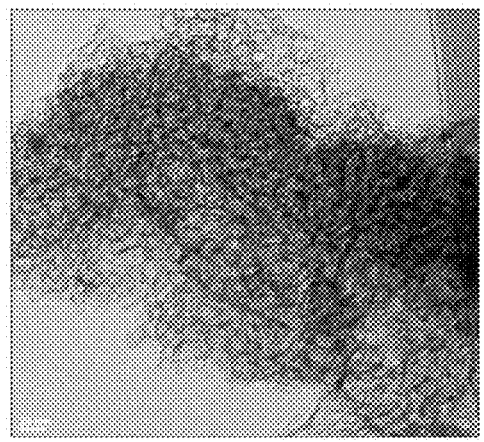
FIG. 22b is a TEM image of a graphene sample generated with solid $CO_2$ (dry ice) on a 10 nanometer scale.
Figure 22C:
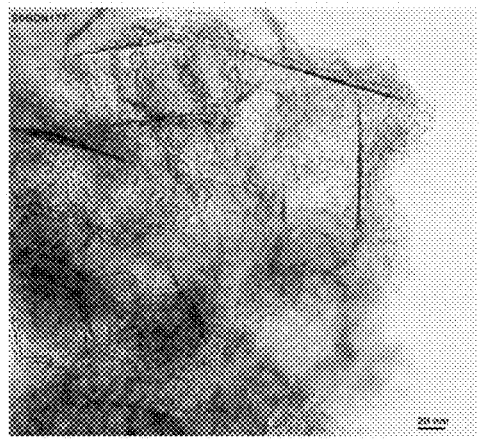
FIG. 22c is a TEM image of a graphene sample generated with gaseous $CO_2$ on a 20 nanometer scale.

The invention consistently produces nanomaterials of similar morphology and character over time, from batch to batch, with different embodiments of the process, and when the feedstock is altered in form and/or pressure, as can be seen in the TEM images of FIGS. 22a-22c. FIGS. 22a and 22b show samples generated by solid $CO_2$ (dry ice) on 10 and 20 nanometer scales, and FIG. 22c shows a sample generated with gaseous $CO_2$ on a 20 nanometer scale. The samples were produced in batch processes over a period of 18 months and treated only with hydrochloric acid (HCl). These images show the remarkable consistency of the graphene morphology over the 18 month period and among the different embodiments of the process.

The invention produces single layer graphenes and graphenes having just a few layers, a valuable nanomaterial with characteristics that are considered promising for a significant number of present and future applications. The presence and the morphology of graphenes have been confirmed by both measured and observed attributes of the material, including appearance, surface area, x-ray reflectivity and porosity are consistent with graphenes.

The invention also produces nanoscale magnesium oxide crystals, or periclase. A significant amount of MgO produced by the reaction can be beneficially vented and captured. The measured purity of captured MgO produced by the invention is 99.2%, which is among the highest levels of purity produced. Such very pure nano MgO may have significant applications in a number of fields, including medicine, electronics and computing, food, and fire safety. This MgO is highly suitable to be used for recycling to magnesium for reuse in the reaction of the invention. The MgO can be functionalized as a fire retardant for plastics by simple reaction with water to form $Mg(OH)_2$.

The invention can also produce unique and potentially valuable combinations of nanomaterials such as intercalated graphene-MgO composites and nano spinels. The graphene-MgO composite materials are believed to be novel materials, and nano spinels are relatively uncommon. Any material present in the reaction is likely to be reduced to nanomaterial form as long as it is a solid at ambient temperature.

The invention has been found to be highly controllable and scalable. The feedstock and other material and gaseous inputs can be varied in size, pressure and chemical composition.

This will produce varied and controllable results, including novel materials, composites, and non-carbon, non-magnesium nanomaterials.

The reaction itself can be regulated or controlled by means such as alteration in the type, nature, morphology, amount, or pressure of the feedstock, injection of inert gases, cooling or pre-heating of the injected materials, type of ignition, and type and size of vessel. This will produce varied and controllable results.

The reaction products can also be controlled. The inputs to the reaction, the energy and temperature of reaction, and other parameters can be manipulated to control the nature, constituency and type of reaction products. Due to the high energy and temperature of the reaction, the reaction may provide way to alter the quantum mechanical attributes of the graphenes and other reaction products, including low electrical resistivity, high electrical conductivity, and/or the magnetic fields issued from the material. The post-reaction processes for treatment, separation, and purification of the material can be managed and controlled to produce varied and controllable products, and intercalated MgO-graphene composites can be reduced or eliminated by the addition of a heat cycle to the purification and separation process.

The invention is scalable and adaptable. The reaction is simple and inherently energetic, producing the energy and temperature required to produce the desired nanomaterials. The feedstock is common and readily available, and the reaction can be contained with known materials and methods. Energy and materials capture and reuse can also be done with known materials and methods. A number of standard, well-known separation processes and methods can be employed and optimized, and the invention provides a novel separation process involving beneficial ejection of MgO. The reaction products are consistent, controllable, and predictable, and the invention can be implemented at different scales and in different forms, ranging from large-scale nanomaterials production to mobile emissions capture. The MgO reaction product can be beneficially captured and efficiently recycled for reuse as magnesium feedstock for the reaction process, thereby avoiding the impact of large-scale operation of the invention on global demand, supply, and price of magnesium.

The invention provides a novel, unique, general, complete and scalable process for production of nanomaterials, including graphenes, which overcomes obstacles that have heretofore prevented the production of carbon nanomaterials from reaching commercial scale and price points suitable for the many industries interested in using such materials to improve their products and solutions.

Previously known methods and strategies for the production of graphenes are not amenable to scaling and cost reduction. Known nanocarbon production processes are energy, materials and labor intensive. They are reliant on mineral or synthetic graphite feedstock. However, the supply of graphite is not elastic, and high quality crystalline graphite, the preferred source material for graphene production, is in limited supply. The energy required for many nanomaterials production processes are significant, with known processes using large amounts of mechanical and/or electrical energy.

Known nanocarbon production processes are difficult to scale. Many of them are difficult to automate and require costly specialized equipment that would be challenging to scale. While processes for producing carbon nanotubes have been widely known for over ten years and promises to scale and lower price points to reasonable levels have been made, the production of carbon nanoproducts is no closer to industrial scale and price than it was ten years ago.

The invention does not rely on graphite or relatively scarce highly crystalline graphite feedstock, but rather on carbon dioxide, a widely available, low cost gas for the production of carbon nanomaterial or graphenes. It utilizes a highly exothermic and beneficial reaction that does not require energy to produce carbon nanomaterial or graphenes. While some energy is used in separating and purifying the reaction products, substantially less energy is used overall by the invention than by other processes, and the energy footprint of the invention could even approach zero. The invention recycles important materials, including the magnesium feedstock and hydrochloric acid used in separation and purification of the reaction products. The simplicity and vigor of the reaction enable the invention to be scaled to produce very large volumes of graphenes. The low cost of carbon dioxide feedstock. the ability to recycle magnesium feedstock, and the relatively simple separation and purification protocol make it possible to produce graphenes at exceptionally low cost, well below the most optimistic estimates for known processes and roughly equivalent to market prices for high quality micronscale graphite powders of comparable purity.

The invention can be implemented in various embodiments, each of which benefits from the unique integrated features and function of the invention and can be utilized to achieve specific objectives. Continuous flow embodiments generally will produce substantially greater volumes of graphenes and other nanomaterials than batch processes, but batch process can be utilized if more precise control and manipulation of the graphene product or customized composite materials are desired. A batch process with gaseous $CO_2$ is the most controllable process for determination of processing variables and allows the graphene material characteristics to be altered readily. The batch process is similar to the "pot lines" used in electrolytic aluminum reduction and in the electric furnace production in steel production. The batch process is also valuable at the development stage for determining system operational parameters.

The modular embodiment can be utilized in the capture and destruction of $CO_2$ and particulates in fixed base or large mobile fossil fuel combustion systems. Also, since MgO is known to perform as a $CO_2$ capture agent, the nano MgO reaction product may be useful in enhancing the performance of an MgO-based $CO_2$ capture system.

The invention has significant advantages for the industrial production of nanomaterials, including scalability, cost, and product quality, e.g. consistency, reliability, and purity. The products of the invention have significant applicability to advanced industrial products, solutions and applications. Graphenes have unique and proven capabilities in electrochemistry and other applications, including catalytics, magnetics, heat and mass transfer, semiconductors, hydrogen storage and advanced materials construction. The ultra pure nano MgO produced by the invention has numerous potential applications in many industries, including the plastics industry, in addition to its use as feedstock for recycled Mg for reuse in the invention. Other nanomaterials that can be readily produced by the invention may also be valuable. Nano Spinets, for example, have application in lithium ion battery cathodes, and nano MgO may be important as a base constituent in $CO_2$ capture.

The invention provides significant control of the inputs as well as the reaction and separation processes. By varying the inputs, temperature, speed, constituents, and other parameters of the reaction and the post-reaction separation process, the morphology, constituency and quantum mechanical attributes of the nano-carbon and other nanoproducts can be controlled.

It is apparent from the foregoing that a new and improved process for the production of graphenes and other nanomaterials has been provided. While only certain presently preferred embodiments have been described in detail, as will be apparent to those familiar with the art, certain changes and modifications can be made without departing from the scope of the invention as defined by the following claims.

The invention claimed is:

1. A process for producing nanomaterials, comprising the steps of: combusting carbon dioxide and at least one earth metal together in an oxidation-reduction, exothermic reaction which produces extremely high energy and heat, cooling products of the reaction to form nanoparticles, and separating nanoparticles of different materials from each other.

2. The process of claim 1 wherein the reaction produces intense amounts of energy including heat at temperatures on the order of 1000° F. (537° C.) to about 7000° F. (3872° C.).

3. The process of claim 1 wherein the nanoparticles are separated by a process selected from the group consisting of annular flow separation, cyclone separation, gravity cell separation, flotation separation, centrifugal separation, beneficial separation, filtration, acid washing, de-ionized water washing, ultrasonic processing, elevated temperature treatment in a vacuum, and combinations thereof.

4. The process of claim 1 wherein heat produced by the reaction is captured and utilized in separating the nanoparticles.

5. The process of claim 1 wherein infrared and ultraviolet energy produced by the reaction is captured.

6. The process of claim 1 wherein the earth metal comprises magnesium.

7. The process of claim 1 wherein the reactants include carbon containing molecules, and the nanoparticles include carbon graphenes.

8. The process of claim 7 wherein the carbon containing molecules include carbon dioxide.

9. The process of claim 1 wherein the extremely high energy and heat are produced by combustion of magnesium (Mg) in the presence of carbon dioxide ($CO_2$).

10. The process of claim 9 including the steps of capturing magnesium oxide (MgO) reaction product, recovering magnesium (Mg) from the MgO reaction product and using the recovered Mg in the reaction.

11. The process of claim 9 wherein the $CO_2$ is recovered from fossil fuel combustion.

12. The process of claim 1 wherein the high energy and heat are produced by a source selected from the group consisting of a solar furnace, a nuclear reaction, an electric arc, magneto hydrodynamic heating of a plasma, and combustion of hydrogen or other fuel.

13. The process of claim 1 including the step of reducing products of the reactions to a smaller size to reduce agglomeration and provide more uniform samples with greater surface area for subsequent treatment.

14. The process of claim 1 wherein the combustion reaction is carried out as a batch process.

15. The process of claim 1 wherein the combustion reaction is carried out on a continuous basis.

16. The process of claim 1 wherein a non-reactant is introduced with and/or combusted with the reactants to form nanoparticles or a nano composite of the non-reactant.

17. The process of claim 16 wherein the non-reactant is selected from the group consisting of silicon, silver, gold, copper, iron, and combinations thereof.

18. The process of claim 1 wherein the reaction is carried out in a $CO_2$ or inert gas atmosphere which prevents post reaction combustion of the reaction products.

19. A process for producing carbon graphenes and other nanomaterials, comprising the steps of combusting carbon dioxide ($CO_2$) and magnesium (Mg) together in a highly exothermic oxidation-reduction reaction that produces a reaction product containing carbon and magnesium oxide (MgO), rapidly cooling the reaction product to form carbon graphenes and MgO nanoparticles, separating the carbon graphenes and the MgO nanoparticles from each other, purifying the carbon graphenes, processing at least some of the MgO to recover Mg from it, and using at least some of the recovered Mg in the combustion reaction.

20. The process of claim 19 wherein the combustion reaction is carried out in a reaction chamber, the gaseous MgO is collected from the reaction chamber, and initial separation of the carbon graphenes and the MgO nanoparticles occurs in the reaction chamber.

21. The process of claim 20 wherein the initial separation is done by annular flow separation, cyclone separation, filtration, gravity cell separation, flotation separation, beneficial separation, and/or centrifugal separation.

22. The process of claim 19 wherein the gaseous MgO is vented from the chamber and collected by a vacuum collection system.

23. The process of claim 19 wherein the carbon graphenes and MgO nanoparticles are separated by washing with deionized water and hydrochloric acid (HCl), treatment with ultrasound to break the particles into finer particles, and separating the ultrasonically treated particles with a filter that collects the graphenes and passes the MgO particles.

24. The process of claim 23 including the steps of drying the filtered graphenes, and treating the dried graphenes with heat to purify them.

25. The process of claim 24 wherein the graphenes are treated in repeated cycles of deionized water treatment, HCl treatment, ultrasound treatment, filtration, graphene drying, and heat treatment the graphenes reach a desired level of purity.

26. The process of claim 25 wherein the cycles are repeated until the graphenes reach a purity level of at least 99%.

27. The process of claim 24 wherein the heat is applied to the graphenes in such manner that the temperature to which the graphenes are exposed increases gradually until a treatment temperature is reached, remains at the treatment temperature for a period of time, and thereafter decreases gradually.

28. The method of claim 19 wherein the Mg is recovered from the MgO by treating the MgO with water to form magnesium hydroxide ($Mg(OH)_2$), treating the $Mg(OH)_2$ with HCl to form $MgCl_2$ and water ($H_2O$), and hydrolytically processing the $MgCl_2$ to separate the magnesium from the chlorine $Cl_2$ and thereby form Mg particles and gaseous $Cl_2$.

29. The method of claim 19 wherein the MgO is heated with carbon, and differential thermal expansion of the MgO and carbon causes cracks to open in the carbon, allowing the HCl to attach to the carbon.

30. The process of claim 19 wherein the combustion reaction is carried out in a batch mode.

31. The process of claim 19 wherein the combustion reaction is carried out as a continuous process.

32. The process of claim 19 wherein another metal is included in the reaction, and the reaction products include an alloy of the other metal and magnesium and/or the other metal infused with graphenes.

33. The process of claim 32 wherein the other metal is selected from the group consisting of aluminum, steel, and iron.

34. The process of claim 19 wherein the reaction is carried out in a $CO_2$ or inert gas atmosphere which prevents post reaction combustion of the reaction products.

35. A process for producing carbon graphenes and other nanomaterials, comprising the steps of combusting carbon dioxide ($CO_2$) and magnesium (Mg) together in a highly exothermic oxidation-reduction reaction that produces a reaction product containing carbon and magnesium oxide (MgO), rapidly cooling the reaction product to form carbon graphenes and MgO nanoparticles, separating the carbon graphenes and the MgO nanoparticles from each other, and purifying the carbon graphenes.

36. The process of claim 35 wherein borane (BH3 or B2H6) is added to the $CO_2$, and a semiconductor is doped with the resulting reaction product to produce a p-doped graphene semiconductor.

37. The process of claim 35 wherein ammonia ($NH_3$) is added to the $CO_2$, and a semiconductor is doped with the resulting reaction product to produce an n-doped graphene semiconductor.

38. A process for producing graphenes, comprising the steps of heating a carbon containing material to extremely high temperature in an oxidation-reduction reaction with carbon dioxide and at least one earth metal to form carbon nanoparticles, and cooling the carbon nanoparticles to form carbon graphenes.

39. The process of claim 1 wherein the earth metal is Selected from the group consisting of aluminum, titanium, zinc, sodium, lithium, calcium, And combinations thereof.

40. The process of claim 7 wherein the carbon containing molecules are selected from the group consisting of carbon monoxide, phosgene ($COCl_2$), Methane, ethylene, acetylene, other carbon containing material, and combinations thereof.

* * * * *